(12) United States Patent
Kang et al.

(10) Patent No.: US 12,238,368 B2
(45) Date of Patent: Feb. 25, 2025

(54) SINK DEVICE, DIGITAL SYSTEM AND METHOD OF CONTROLLING CEC COMMUNICATION

(71) Applicant: SAMSUNG ELECTRONICS CO., LTD., Suwon-si (KR)

(72) Inventors: Seongin Kang, Suwon-si (KR);
Tecksheng Ng, Suwon-si (KR);
Bongchan Cho, Suwon-si (KR);
Hyeongsu Choi, Suwon-si (KR);
Dooyoung Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 139 days.

(21) Appl. No.: 18/210,837

(22) Filed: Jun. 16, 2023

(65) Prior Publication Data
US 2024/0073480 A1    Feb. 29, 2024

(30) Foreign Application Priority Data

Aug. 31, 2022 (KR) .......... 10-2022-0109775

(51) Int. Cl.
*H04N 21/4363* (2011.01)
*H04N 21/258* (2011.01)
*H04N 21/442* (2011.01)

(52) U.S. Cl.
CPC . *H04N 21/43635* (2013.01); *H04N 21/25891* (2013.01); *H04N 21/44227* (2013.01)

(58) Field of Classification Search
CPC ....... H04N 21/25891; H04N 21/43615; H04N 21/43635; H04N 21/4427; H04N 21/4425; H04N 21/6168; H04N 7/0125; H04L 41/0631; H04L 43/0805
See application file for complete search history.

(56) References Cited

U.S. PATENT DOCUMENTS 5,043,829 A * 8/1991 Hahn ............. G11B 27/28
6,825,858 B2 * 11/2004 Sato ............. H04N 21/47
                                        348/E5.103

(Continued)

FOREIGN PATENT DOCUMENTS

JP    5698945 A    4/2012
KR     751410 A    3/2007
(Continued)

*Primary Examiner* — Michael B. Pierorazio
(74) *Attorney, Agent, or Firm* — Fish & Richardson P.C.

(57) ABSTRACT

A method of controlling consumer electronics control (CEC) communication between a sink device and a plurality of source devices connected through high-definition multimedia interface (HDMI) cables may include; generating cable connection information by monitoring whether the HDMI cables are respectively connected to a HDMI port among a plurality of HDMI ports of the sink device, generating CEC error information by monitoring whether a voltage of an internal CEC node is fixed, wherein CEC lines included in connected HDMI cables are commonly connected to the internal CEC node and the connected HDMI cables indicate present connection to the plurality of HDMI ports, and executing a user guide to diagnose a stuck state of the CEC lines of the connected HDMI cables in response to the cable connection information and the CEC error information.

20 Claims, 19 Drawing Sheets

(56) References Cited

U.S. PATENT DOCUMENTS

| | | | |
|---|---|---|---|
| 7,567,592 B2* | 7/2009 | Kobayashi | G06F 3/14 |
| | | | 370/538 |
| 8,248,530 B2* | 8/2012 | Sato | H04N 21/43632 |
| | | | 348/554 |
| 8,255,579 B2* | 8/2012 | Kikkawa | G09G 5/003 |
| | | | 710/36 |
| 8,260,977 B2* | 9/2012 | Terauchi | H04N 21/43615 |
| | | | 710/15 |
| 8,544,055 B2* | 9/2013 | Kimoto | H04L 25/0272 |
| | | | 725/151 |
| 10,013,328 B2* | 7/2018 | Hardt | G06F 13/385 |
| 2008/0080596 A1* | 4/2008 | Inoue | G06F 3/14 |
| | | | 375/E7.076 |
| 2008/0152023 A1* | 6/2008 | Yoshida | G09G 5/006 |
| | | | 348/553 |
| 2009/0027405 A1* | 1/2009 | Kaga | G09G 5/006 |
| | | | 345/520 |
| 2009/0150961 A1* | 6/2009 | Kabuto | H04N 13/194 |
| | | | 725/118 |
| 2009/0153737 A1* | 6/2009 | Glen | H04N 5/21 |
| | | | 348/E5.062 |
| 2009/0157885 A1* | 6/2009 | Takatsuji | H04L 12/282 |
| | | | 709/228 |
| 2009/0190040 A1* | 7/2009 | Watanabe | H04N 5/765 |
| | | | 348/725 |
| 2009/0193490 A1* | 7/2009 | Stone | H04N 21/462 |
| | | | 725/151 |
| 2009/0244391 A1* | 10/2009 | Kitami | H04N 21/436 |
| | | | 348/E5.057 |
| 2009/0256963 A1* | 10/2009 | Sato | H04N 21/426 |
| | | | 348/554 |
| 2009/0281643 A1* | 11/2009 | Higuchi | H04N 21/4345 |
| | | | 348/554 |
| 2009/0282437 A1* | 11/2009 | Malec | G06F 3/1423 |
| | | | 725/40 |
| 2009/0284536 A1* | 11/2009 | Yoshida | H04N 21/43635 |
| | | | 345/520 |
| 2009/0316004 A1* | 12/2009 | Kitamori | H04N 21/4135 |
| | | | 348/207.1 |
| 2011/0047586 A1* | 2/2011 | Koizumi | H04N 21/43635 |
| | | | 725/118 |
| 2011/0067082 A1* | 3/2011 | Walker | H04H 60/05 |
| | | | 725/114 |
| 2011/0154414 A1* | 6/2011 | Kimoto | H04N 5/775 |
| | | | 725/78 |
| 2011/0181766 A1* | 7/2011 | Hashiguchi | H04N 23/54 |
| | | | 348/333.12 |
| 2011/0206355 A1* | 8/2011 | Toba | H04N 5/44 |
| | | | 704/E21.001 |
| 2013/0086622 A1* | 4/2013 | Narushima | H04N 21/43635 |
| | | | 725/138 |
| 2013/0159565 A1* | 6/2013 | Soyannwo | G09G 5/006 |
| | | | 710/33 |
| 2013/0232356 A1* | 9/2013 | Sato | H04N 21/443 |
| | | | 713/320 |
| 2013/0283333 A1* | 10/2013 | Sato | H04N 21/43635 |
| | | | 725/127 |
| 2016/0134932 A1* | 5/2016 | Karp | H04L 67/125 |
| | | | 348/207.11 |
| 2022/0394317 A1* | 12/2022 | Jang | H04N 21/43635 |
| 2024/0073480 A1* | 2/2024 | Kang | H04N 21/4425 |

FOREIGN PATENT DOCUMENTS

| | | |
|---|---|---|
| KR | 20090074860 A | 7/2009 |
| KR | 1254408 A | 10/2012 |

* cited by examiner

FIG. 5

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2- | 4 | TMDS DATA1+ |
| 5 | TMDS DATA1 SHIELD | 6 | TMDS DATA1- |
| 7 | TMDS DATA0+ | 8 | TMDS DATA0 SHIELD |
| 9 | TMDS DATA0- | 10 | TMDS CLOCK+ |
| 11 | TMDS CLOCK SHIELD | 12 | TMDS CLOCK- |
| 13 | CEC | 14 | UTILITY |
| 15 | SCL | 16 | SDA |
| 17 | DDC/CEC GROUND | 18 | +5V POWER |
| 19 | HOT PLUG DETECT | | |

FIG. 10

| | | |
|---|---|---|
| Ts | 0ms | THE BIT START EVENT |
| T1 | 0.4ms | THE EARLIEST TIME FOR A LOW-HIGH TRANSITION WHEN INDICATING A LOGICAL 1 |
| T2 | 0.8ms | THE LATEST TIME FOR A LOW-HIGH TRANSITION WHEN INDICATING A LOGICAL 1 |
| T3 | 0.85ms | THE EARLIEST TIME IT IS SAFE TO SAMPLE THE SIGNAL LINE TO DETERMINE ITS STATE |
| T4 | 1.25ms | THE LATEST TIME IT IS SAFE TO SAMPLE THE SIGNAL LINE TO DETERMINE ITS STATE |
| T5 | 1.3ms | THE EARLIEST TIME A DEVICE IS PERMITTED RETURN TO A HIGH IMPEDANCE STATE(LOGICAL 0) |
| T6 | 1.7ms | THE LATEST TIME A DEVICE IS PERMITTED RETURN TO A HIGH IMPEDANCE STATE(LOGICAL 0) |
| T7 | 2.05ms | THE EARLIEST TIME FOR THE START OF A FOLLOWING BIT |
| | 2.4ms | THE NOMINAL DATA BIT PERIOD |
| T8 | 2.75ms | THE LATEST TIME FOR THE START OF A FOLLOWING BIT |

VH ——————————————
Vref ---------------------------------
VL ——————————————

FIG. 15

VH ----------------------------------------
Vref2 --------------------------------------
Vref1 --------------------------------------
VL ----------------------------------------

SINK DEVICE, DIGITAL SYSTEM AND METHOD OF CONTROLLING CEC COMMUNICATION

CROSS-REFERENCE TO RELATED APPLICATION

This U.S. non-provisional application claims priority under 35 USC § 119 to Korean Patent Application No. 10-2022-0109775 filed on Aug. 31, 2022 in the Korean Intellectual Property Office, the subject matter of which is hereby incorporated by reference in its entirety.

BACKGROUND

1. Technical Field

Embodiments of the inventive concept relate generally to semiconductor integrated circuits, and more particularly to sink devices, digital system including at least one sink device and methods of controlling consumer electronics control (CEC) communication in relation to the sink device.

2. Discussion of the Related Art

As the spread of digital contents has recently become commonplace, digital systems are widely used in which various digital content is provided by multimedia source devices (e.g., camcorders, Digital Versatile Disc (DVD) players, PlayStation 3 (PS3), set-top boxes, Blu-Ray (BD) players) to sink devices (e.g., monitors and digital television (TV) sets) capable of receiving, processing and displaying the digital contents.

The so-called high-definition multimedia interface (HDMI) is one example of various inputs that may be applied to contemporary and emerging sink devices. HDMI is an ungraded interface when compared with legacy digital visual interfaces (DVI). For example, legacy DVI transmits only digital video, whereas HDMI transmits digital video, digital audio and additional information via a single interface. That is, HDMI is a single digital interface integrating existing RGB, Y, Cb/Cr channels, as well as audio channels into a single channel, and capable of transmitting a high-definition video signal and a multi-channel audio signal at speed of at least 5 Gbps.

HDMI consists of three (3) independent communication channels: Transition Minimized Differential Signaling (TMDS); Display Data Channel (DDC); and Consumer Electronics Control (CEC). Using these independent communication channels, HDMI may communicate (e.g., transmit and/or receive) audio/visual (A/V) data, device information and control commands, etc.

HDMI specifications and functional characteristics are defined by conventionally understood and commercially available technical standards. These standards define a CEC standard as a communication protocol for various signals controlling different sink devices. In general, since CEC lines are directly connected to all sink devices included in a CEC network, a defect in a single sink device may adversely affect the entire network. For example, should a problem arise in CEC communication associated with an entire network, it may be impossible to resolve due to a soft defect in one sink device or one HDMI cable. In this regard, when a CEC terminal of a sink device or one HDMI cable becomes "stuck" at a fixed voltage, other CEC lines throughout the network may become stuck, thereby making CEC communication impossible.

SUMMARY

Embodiments of the inventive concept provide a sink device and a digital system including a sink device capable of efficiently diagnosing a CEC error and resolving same.

Embodiments of the inventive concept provide a method of controlling CEC communication in relation to a sink device, wherein the method of controlling CEC communication is capable of efficiently diagnosing CEC error(s) and resolving same.

According to embodiments of the inventive concept, a method of controlling consumer electronics control (CEC) communication of a sink device connected to a plurality of source devices through high-definition multimedia interface (HDMI) cables may include; generating cable connection information by monitoring whether the HDMI cables are respectively connected to a HDMI port among a plurality of HDMI ports of the sink device, generating CEC error information by monitoring whether a voltage of an internal CEC node is fixed, wherein CEC lines included in connected HDMI cables are commonly connected to the internal CEC node and the connected HDMI cables indicate present connection to the plurality of HDMI port, and executing a user guide to diagnose a stuck state of the CEC lines of the connected HDMI cables in response to the cable connection information and the CEC error information.

According to embodiments of the inventive concept, a sink device may be connected to a plurality of source devices through high-definition multimedia interface (HDMI) cables and may include; a plurality of HDMI ports respectively connecting HDMI cables from source devices, a cable connection monitor configured to monitor whether an HDMI cable is connected to each HDMI port among the plurality of HDMI ports to generate cable connection information, a stuck monitor configured to monitor whether a voltage of an internal consumer electronics control (CEC) node to is fixed, wherein CEC lines included in the HDMI cables are commonly connected to the internal CEC node and the HDMI cables indicate present connection to the plurality of HDMI ports, and a diagnostic controller configured to execute a user guide to diagnose a stuck state of the CEC lines of the HDMI cables in response to the cable connection information and the CEC error information.

According to embodiments of the inventive concept, a digital system may include; a sink device, at least one source device, and high-definition multimedia interface (HDMI) cables respectively connecting the sink device and the at least one source device. The sink device may include; a plurality of HDMI ports configured to connect HDMI cables respectively connected to the at least one source device, a cable connection monitor configured to monitor whether an HDMI cable is connected to each HDMI cable among the plurality of HDMI ports to generate cable connection information, a stuck monitor configured to monitor whether a voltage of an internal consumer electronics control (CEC) node to is fixed to generate a CEC error information, wherein CEC lines included in the HDMI cables are commonly connected to the internal CEC node and the HDMI cables indicate present connection to the plurality of HDMI ports, and a diagnostic controller configured to execute a user guide to diagnose a stuck state of the CEC lines of the HDMI cables in response to the cable connection information and the CEC error information.

BRIEF DESCRIPTION OF THE DRAWINGS

Advantages, benefits and features, as well as the making and use of the inventive concept may be clearly understood upon consideration of the following detailed description together with the accompanying drawings, in which:

FIGS. 4 and 5 related diagrams illustrating an exemplary pin configuration for a transition minimized differential signaling (HDMI) cable that may be included in a digital system according to embodiments of the inventive concept;

FIGS. 8, 9 and 10 are related timing diagrams illustrating exemplary bit timing associated with CEC communication performed using a CEC line in a digital system according to embodiments of the inventive concept;

FIG. 15 is a diagram illustrating voltages associated with the stuck monitor of FIG. 14;

DETAILED DESCRIPTION

Throughout the written description and drawings, like reference numbers and labels are used to denote like or similar elements, components, features and/or method steps.

Figure 1:
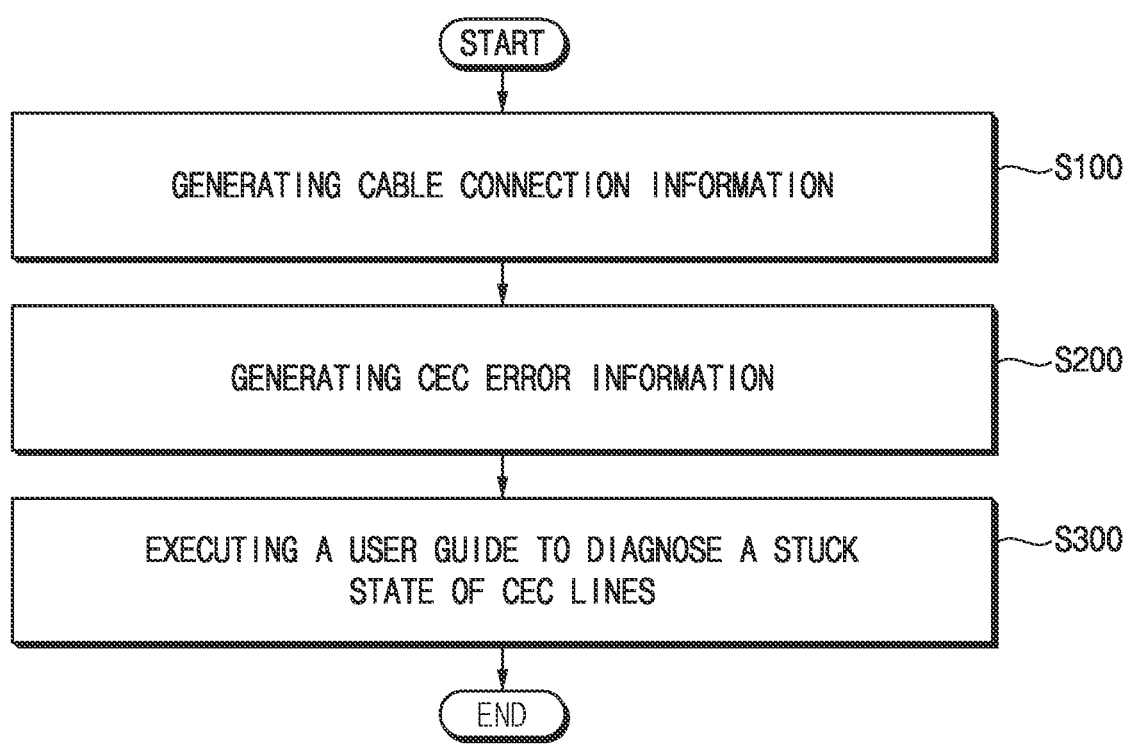
FIG. 1 is a flowchart illustrating a method of controlling consumer electronics control (CEC) communication of a sink device according to embodiments of the inventive concept.

Figure (FIG. 1 is a flowchart illustrating a method of controlling consumer electronics control (CEC) communication of a sink device according to embodiments of the inventive concept, wherein the sink device may be variously connected to multiple source devices through high-definition multimedia interface (HDMI) cables.

Referring to FIG. 1, the method of controlling CEC communication of a sink device may generally include: generating cable connection information (S100); and generating CEC error information (S200).

In some embodiments, cable connection information may be generated by monitoring (or determining) whether a HDMI cable is connected to each HDMI port (potentially among a plurality of HDMI ports) of the sink device (S100). In some embodiments like the embodiment described hereafter in relation to FIG. 7, a pull-up voltage may be applied to a ground terminal among the input terminals included in each HDMI port in order to determine whether an HDMI cable is connected to the HDMI port based on (or in response to) a voltage associated with the one ground terminal.

In some embodiments, CEC error information may be generated by monitoring whether a voltage associated with an internal CEC node is fixed, wherein CEC lines included in connected HDMI cables are commonly connected to the internal CEC node and the connected HDMI cables indicate present connection to the plurality of HDMI ports (S200). Possible approaches to the generating of the CEC error information are further described hereafter in relation to FIGS. 8, 9, 10, 11, 12, 13 and 14.

Referring to FIG. 1, the method of controlling CEC communication of a sink device may further include executing a user guide to diagnose a stuck state associated with the CEC lines of the connected HDMI cables in response to the cable connection information and the CEC error information (S300). Here, the "user guide" may be understood as a diagnostic capability that may be used to determine whether a stuck state exists for the connected HDMI cables using the cable connection information and the CEC error information. The user guide may also provide analysis, information and functional capabilities sufficient to resolve the stuck state. Possible approaches to the executing of the user guide will be described hereafter in relation to FIGS. 16, 17 and 18.

HDMI CEC is a communication standard that may be used to connect a source device and a sink device through an HDMI cable, such that user's commands may be executed through communication path(s) between various AV devices. Among the 19 pins associated with the HDMI connector, one pin (e.g., pin 13 or the CEC bus line) may be used to communicate variously. In an idle state, the CEC bus line is pulled up to between about 2.5 to 3.36V. CEC communication occurs when the CEC device toggles the CEC bus line between a "high" voltage or pull-up voltage (e.g., 2.5 to 3.36V) and a "low" voltage or pull-down voltage (e.g., 0 to 0.6V).

Depending on the environment, several devices may be connected to the CEC bus line. When an HDMI cable or source device connected to only one HDMI port causes the CEC line to become "stuck" (e.g., unresponsive and fixed) in an abnormal voltage state (e.g., ground voltage or 0V), CEC communication with the corresponding device may be impossible. That is, conventionally, there has been no way to determine the connected situation of a device suffering this type of problem. Accordingly, many consumer complaints related to malfunctions due to CEC errors have been received, and field service business trip response is required for each consumer request (e.g., HDMI CEC-Less Cable replacement, etc.) is necessary, thereby increasing after-service costs.

However, sink devices, digital system including at least one sink device, and methods of controlling CEC communication according to embodiments of the inventive concept better optimize CEC communication and enhance the performance of sink device(s) within a digital system by efficiently diagnosing CEC error(s) and facilitating resolution of problems. In addition, by providing positive feedback to the user of resolution measures with respect to the CEC error through execution of the user guide, product reliability may be improved, and user experiences enhanced to avoid unnecessary after sales service.

Figure 2:
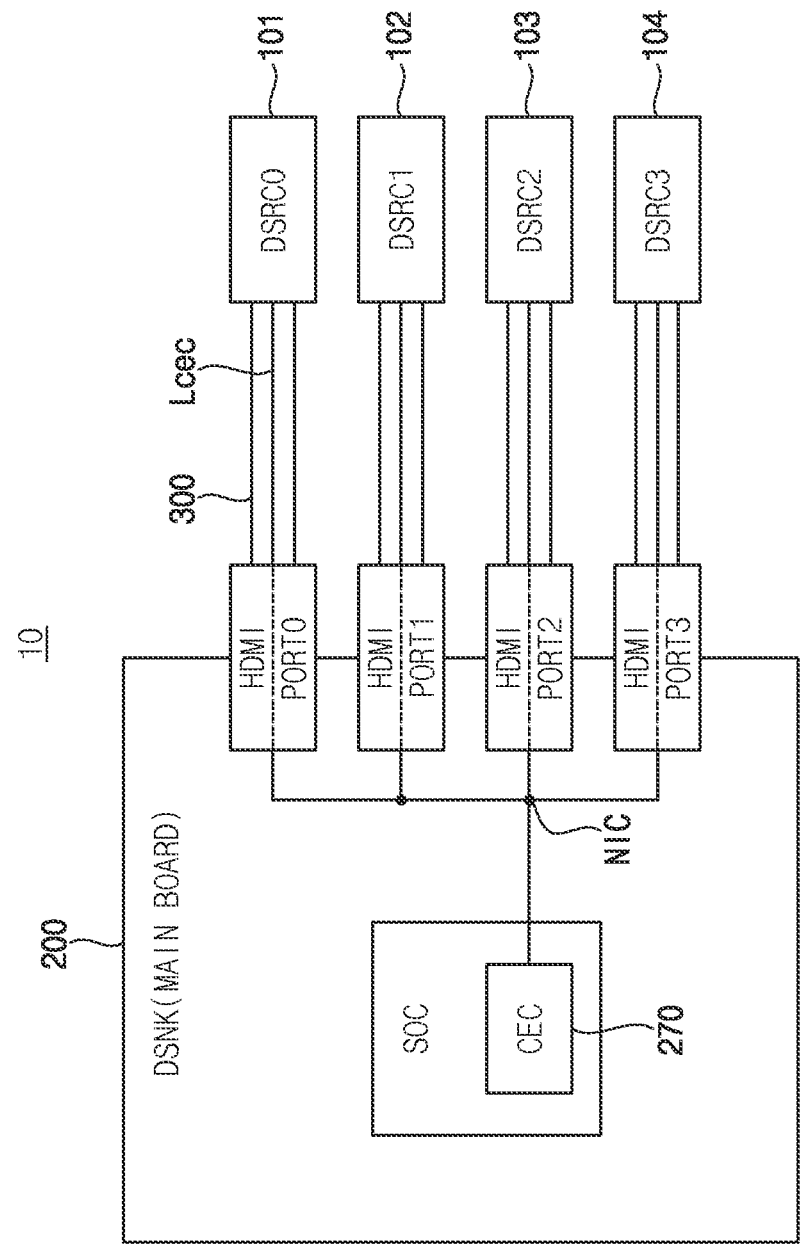
FIG. 2 is a block diagram illustrating a digital system according to embodiments of the inventive concept.

FIG. 2 is a block diagram illustrating a digital system 10 according to embodiments of the inventive concept.

Referring to FIG. 2, the digital system 10 may include a sink device (DSNK) 200, one or more source devices (DSRC0, DSRC1, DSRC2 and SDRC3) 101, 102, 103 and 104, one or more High-Definition Multimedia Interface (HDMI) cables 300 respectively connecting and the sink device 200 with the one or more source devices 101, 102, 103 and 104.

The sink device 200 may include a plurality of HDMI ports PORT0, PORT1, PORT2 and PORT3 and a consumer electronics control (CEC) controller 270. here, it should be noted that the illustrated example of FIG. 2 shows only basic components and those skilled in the art will appreciate that the sink device 200 may further include various components in accordance with its design and functionality. In some embodiments, the CEC controller 270 may be included in a system on chip (SoC) mounted on a main board of the sink device 200.

The CEC lines Lcec respectively included in each HDMI cables 300 connected to each HDMI port may be commonly connected to an internal CEC node NIC through CEC pins or CEC terminals included in the plurality of HDMI ports (PORT0-PORT3). Here, the illustrated example of FIG. 2 shows an internal CEC node NIC located on the main board of the sink device 200, but embodiments of the inventive concept are not limited thereto. In some embodiments, the internal CEC node NIC may be disposed within the SoC mounted on the main board of the sink device 200.

CEC controller 270 may generate the CEC error information by monitoring whether the voltage of the internal CEC node NIC is fixed. (See, e.g., the description that follows in relation to FIG. 6).

Figure 3:
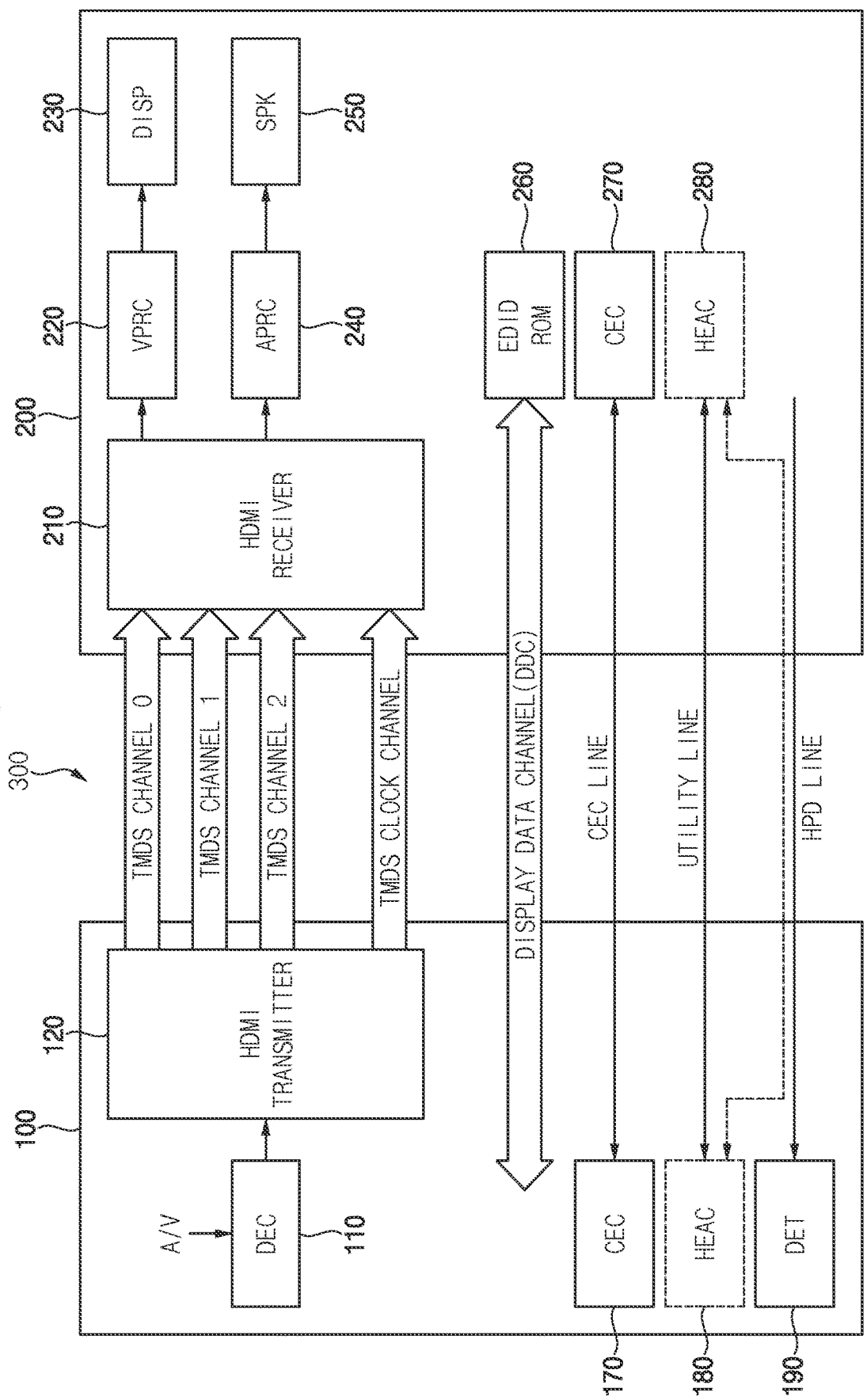
FIG. 3 is a block diagram further illustrating in one example connections and configurations of a sink device and a source device included in a digital system according to embodiments of the inventive concept.

FIG. 3 is a block diagram further illustrating in one example various connections 300 and related configurations for the sink device 200 and a source device 100 (e.g., 101, 102, 103 and 104) included in a digital system according to embodiments of the inventive concept.

For clarity of illustration, only a connection between the sink device 200 and one source device 100 is shown in FIG. 3. However, one or more of the source device(s) 101, 102, 103 and 104 indicated in FIG. 2 may be connected to the sink device 200 in like manner as that shown in FIG. 3 through respective HDMI cables and HDMI ports.

Referring to FIG. 3, the source device 100 may include a decoder (DEC) 110, a HDMI transmitter 120, a CEC controller 170, and an HDMI Ethernet and Audio return channel (HEAC) controller 180, and a detector (DET) 190.

The decoder 110 decodes digital A/V signals A/V received from a storage disc or a set top box receiving broadcasting signals and may correspondingly provide (or output) decoded data.

The HDMI transmitter 120 then transmits the digital audio and video data decoded by the decoder 110 as a signal conforming to the HDMI digital interface. The HDMI transmitter 120 may include a TMDS encoder to convert the data decoded by the decoder 110 into a format that may be transmitted through the digital interface of HDMI and perform TMDS encoding to transmit the data to the sink device 200 through the HDMI cable 300.

Although not shown in FIG. 3, the source device 100 may include at least one processor. When the HDMI cable 300 is connected, the processor of the source device 100 may read data format (e.g., EDID) information for recognizing the sink device 200 through the DDC/CEC line from the ROM 260 of the sink device 200. The processor may determine signal states of a display data channel (DDC), a CEC line, a utility line, and a hot plug detection (HDP) line through the CEC controller 170, the HEAC controller 180, and the detector 190. When the connection of the HDMI cable is detected to the sink device 100, the processor may perform a control operation to automatically set the output port to the HDMI port.

The sink device 200 may include an HDMI receiver 210 corresponding to the HDMI transmitter 120, a video processor (VPRC) 220, a display unit (DISP) 230, an audio processor (APRC) 240, a speaker (SPK) 250, an EDID ROM 260, a CEC controller 270, and an HEAC controller 280.

The HDMI receiver 210 may receive digital video and audio signals transmitted from the HDMI transmitter 120 of the source device 100, and the HDMI receiver 210 may include a TMDS decoder to perform the DMDS decoding on the HDMI signals that has been converted into a format capable of communication through the digital interface of HDMI.

The video processor 220 may process the digital video signal communicated from the HDMI receiver 210 and output decoded audio signal to the display unit 230, and the audio processor 240 may process the digital audio signal received from the HDMI receiver 210 and output decoded audio signal to the speaker 250.

In some embodiments, the EDID ROM 260 may be implemented as an EEPROM configured to store EDID data. A data format specified by Video Electronics Standards Association (VESA) (e.g., the extended display identification data (EDID)) may include display characteristic information data including information such as manufacturer or standard, supportable resolution and color format, etc. Such EDID data may be stored in the internal EDID ROM 260 when the source device 200 is manufactured.

The HDMI system architecture is defined to include source devices and sink devices. Each device may have one or more HDMI inputs and/or one or more HDMI outputs. Each HDMI input must follow all of the "rules" (e.g., technical specifications) associated with the HDMI sink and each HDMI output must follow all of the rules associated with the HDMI source. As shown in FIG. 3, the HDMI cable 300 may transmit data and clock signals through four (4) differential signal channels (e.g., three TDMS channels (CHANNEL 0, 1, and 2) and a clock channel). Audio data, video data, and auxiliary data may be transferred through these channels. DDC is used for configuration and status exchange between one source device 100 and one sink device 200. The CEC protocol is used to provide high-level control between all the various audiovisual (AV) products in the user environment. HEAC provides Ethernet networking and Audio Return Channel (ARC) in the opposite direction to TMDS between connected devices. The utility line is used for extended optional features such as HEAC specified in the HDMI standard.

Figure 4:
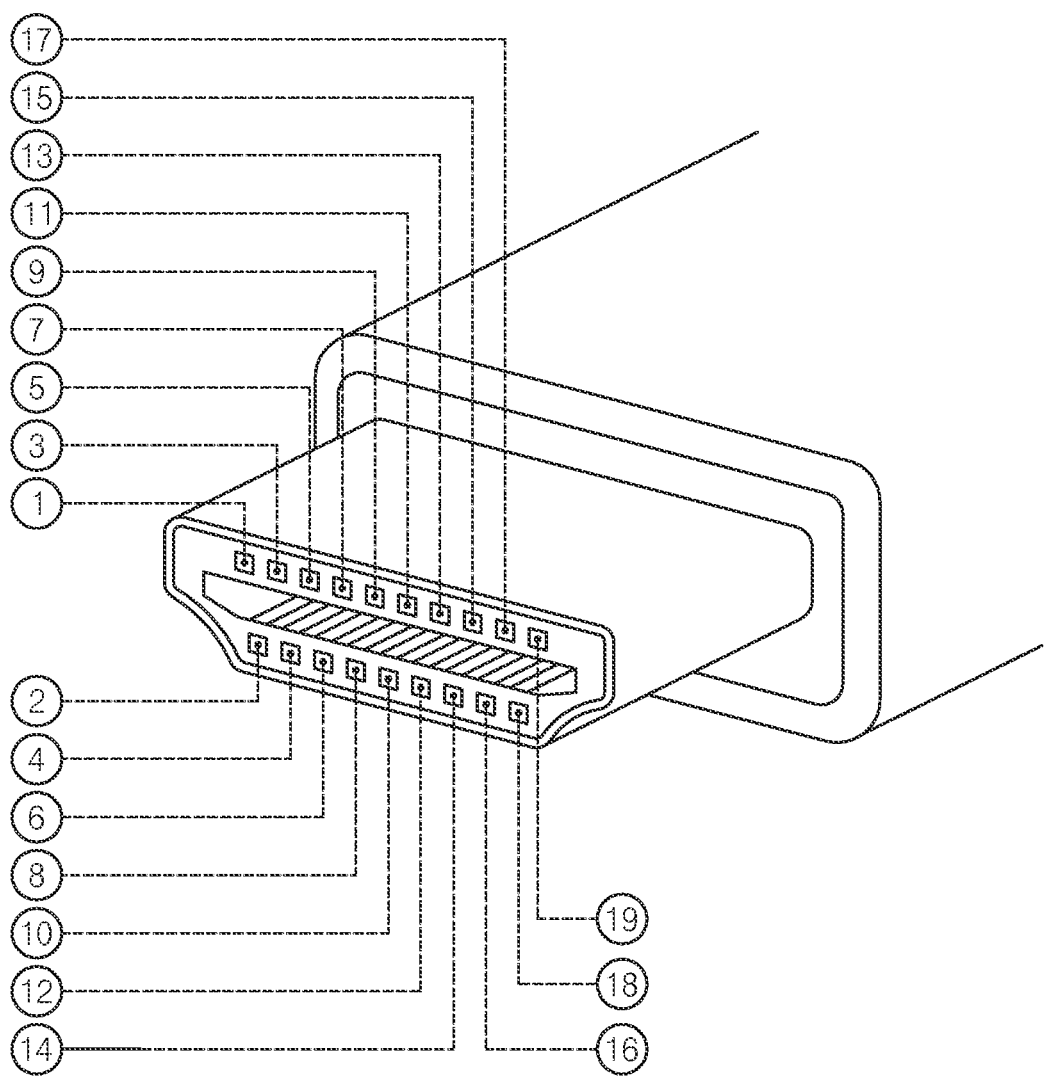

FIGS. 4 and 5 are related diagrams illustrating an example pin configuration for a transition minimized differential signaling (HDMI) cable that may be included in a digital system according to embodiments of the inventive concept.

Referring to the perspective diagram of FIG. 4, an arrangement of 19 pins associated with an A-type HDMI cable, as specified in the HDMI standard, is shown. And referring to the signal assignment table of FIG. 5, various signal assignments may be made for each pin. For example, pins 7 and 9 may correspond to one TMDS data channel (TMDS DATA0), pins 4 and 6 may correspond to one TMDS data channel (TMDS DATA1), and pins 7 and 9 may correspond to one TMDS data channel (TMDS DATA0), pins 1 and 3 may correspond to one TMDS data channel (TMDS DATA2), and pins 10 and 12 may correspond to one TMDS clock channel Here, pin 13 may be a CEC pin associated with embodiments of the inventive concept, pin 14 may be associated with utilities, such as HEAC, pin 18 may provide 5V power, and pin 19 may be a hot plug detection pin. Pins 15 and 16 may correspond to the DDC of FIG. 3, wherein DDC may correspond to an Inter-Integrated Circuit (I2C) bus using two signal paths, a Serial Clock Line (SCL) and a Serial Data Line (SDA).

As shown in FIGS. 4 and 5, pin 13 corresponding to CEC and pin 11 corresponding to the shield (or ground) of the TMDS clock may be adjacent and may be easily short-circuited—in which case, the CEC line will be connected to ground voltage. This particular aspect may become relevant in circumstances wherein the CEC becomes stuck (enters a stuck state) due to one of various causes such as defects in a HDMI cable or a HDMI device.

Figure 6:
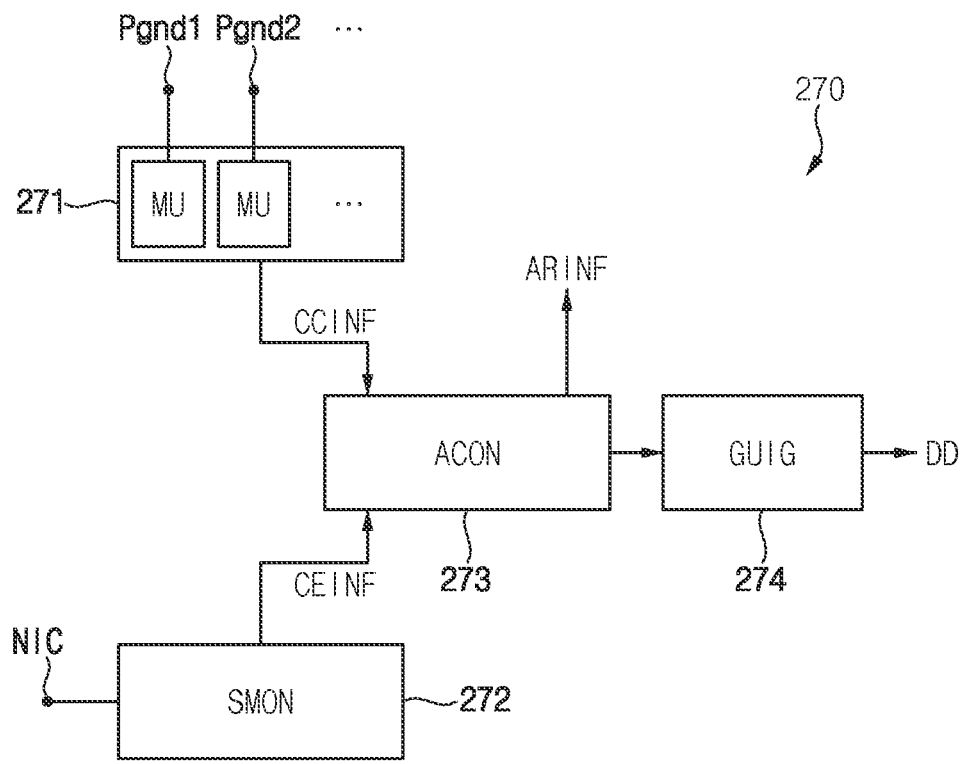
FIG. 6 is a block diagram illustrating in one example the CEC controller 270 of FIG. 2.

FIG. 6 is a block diagram further illustrating in one example the CEC controller 270 associated with the sink device 200 of FIG. 2 according to embodiments of the inventive concept.

Referring to FIG. 6, CEC controller 270 may include a cable connection monitor 271, a stuck monitor (SMON) 272, a diagnostic controller (ACON) 273 and a graphic user interface generator (GUIG) 274. In some embodiments, the CEC controller 270 may additionally include a transceiver facilitating CEC communication, as well as other components. Those skilled in the art will appreciate that the cable connection monitor 271, the stuck monitor (SMON) 272, the diagnostic controller (ACON) 273 and/or the graphic user interface generator (GUIG) 274 may be various implemented in hardware, software, and/or firmware.

here, the cable connection monitor 271 may be used to generate cable connection information CCINF by monitoring whether an HDMI cable is connected to each of a plurality of HDMI ports. In some embodiments, the cable connection monitor 271 may include a plurality of monitoring units MU respectively corresponding to the plurality of HDMI cables. Each monitoring unit MU may be connected to one ground terminal Pgnd1 or Pgnd2 among input terminals included in each HDMI port to monitor whether an HDMI cable is connected to each HDMI port. One example of monitoring unit 271 will be described hereafter in some additional detail with reference to FIG. 7.

The stuck monitor 272 may be used to generate CEC error information CEINF by monitoring whether the voltage of the internal CEC node NIC is fixed. As described above, the CEC lines included in one or more connected HDMI cables respectively connected to a plurality of HDMI ports are commonly connected to the internal CEC node NIC. Examples of the stuck monitor 272 will be described hereafter in some additional detail with reference to FIGS. 8, 9, 10, 11, 12, 13, 14 and 15.

Diagnostic controller 273 may be used to execute (or perform) the user guide in order to diagnose a stuck state of CEC lines of the connected HDMI cables in response to the cable connection information CCINF and the CEC error information CEINF. Examples of user guide execution by the diagnostic controller 273 will be described hereafter in some additional detail with reference to FIGS. 16, 17 and 18. Here, for example, diagnostic controller 273 may provide diagnostic result information ARINF according to execution of the user guide and provide same to a processor associated with the sink device 200.

In some embodiments, the graphic user interface generator 274 may be used to generate and control an interactive graphic user interface (GUI) associated with executing the user guide under the control of the diagnostic controller 273. The display data DD corresponding to the graphic user interface may be provided to the display device such that a user may be notified of CEC state information and necessary measures (e.g., required actions) and user commands may be received through the GUI.

Figure 7:
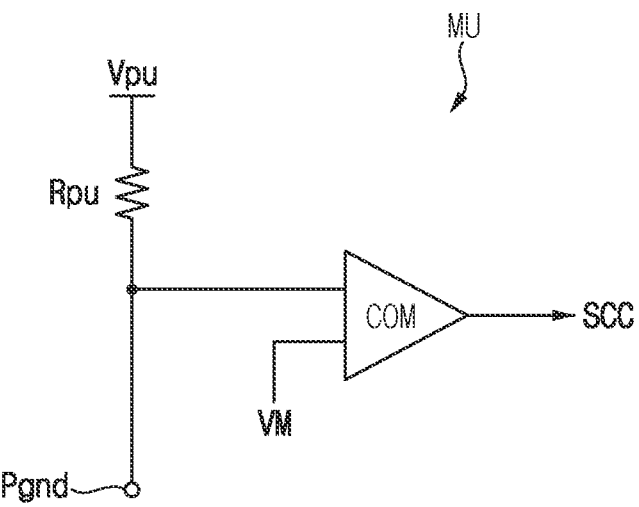
FIG. 7 is a circuit diagram illustrating in one example the connection monitor (MU) included in the CEC controller of FIG. 6.

FIG. 7 is a circuit diagram illustrating in one example the connection monitor unit (MU) included in the CEC controller 270 of FIG. 6.

For clarity of illustration, only one MU is shown in FIG. 7, recognizing that a plurality of monitoring units may be included in the cable connection monitor 271 of FIG. 6.

Referring to FIG. 7, the monitoring unit MU may include a resistor Rpu and a comparator COM.

The resistor Rpu may be connected between the pull-up voltage Vpu and the ground terminal Pgnd to apply the pull-up voltage Vpu to the ground terminal Pgnd. The ground terminal Pgnd may correspond to one ground terminal among input terminals included in each HDMI port of the plurality of HDMI ports. For example, the ground terminal Pgnd may correspond to one of pins 2, 5, 8, 11, and 17 previously described with reference to FIGS. 4 and 5.

The comparator COM may generate a cable connection signal SCC indicating whether an HDMI cable is connected to each HDMI port by comparing the voltage of the one ground terminal Pgnd and a monitoring reference voltage VM.

The voltage level of the pull-up voltage Vpu and the resistance value of the resistor Rpu may be determined to be appropriate values to minimize leakage current within a range in which connection monitoring is possible, and the monitoring reference voltage VM may be set to an appropriate voltage level between the pull-up voltage Vpu and ground voltage (e.g., 0V).

When the HDMI cable is not connected to the corresponding HDMI port, the ground terminal Pgnd is pulled up with the pull-up voltage Vpu, and the voltage of the ground terminal Pgnd becomes higher than the monitoring reference voltage VM. In this case, the comparator COM may deactivate the cable connection signal SCC to a first logic level (e.g., a low level).

On the other hand, when the HDMI cable is connected to the corresponding HDMI port, the ground terminal Pgnd is pulled down by the source device, and the voltage of the ground terminal Pgnd is lower than the monitoring reference voltage VM. In this case, the comparator COM may activate the connection signal SCC to a second logic level (e.g., a high level).

In this way, the logic level of the cable connection signal SCC may indicate whether an HDMI cable is presently connected to the corresponding HDMI port.

The plurality of cable connection signals SCC respectively generated by the plurality of monitoring units MU may be provided to the diagnostic controller 273 of FIG. 6 as the above-described cable connection information CCINF. In some embodiments, the cable connection information CCINF may further include information about the time when each cable access signal SCC is activated, that is, the time when the HDMI cable is connected to the corresponding HDMI port.

Figure 8:
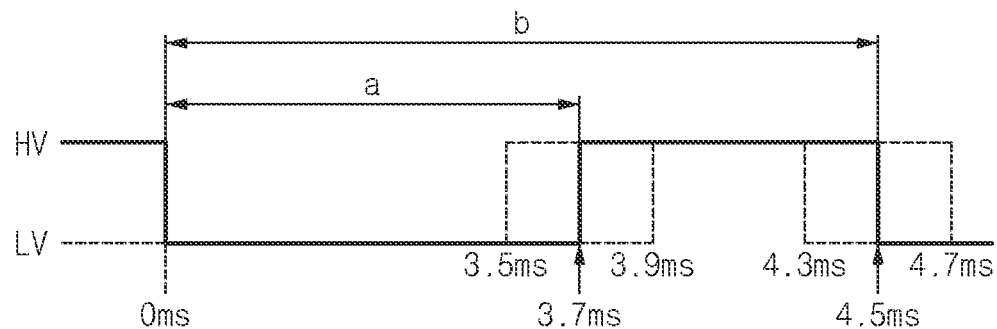
Figure 9:
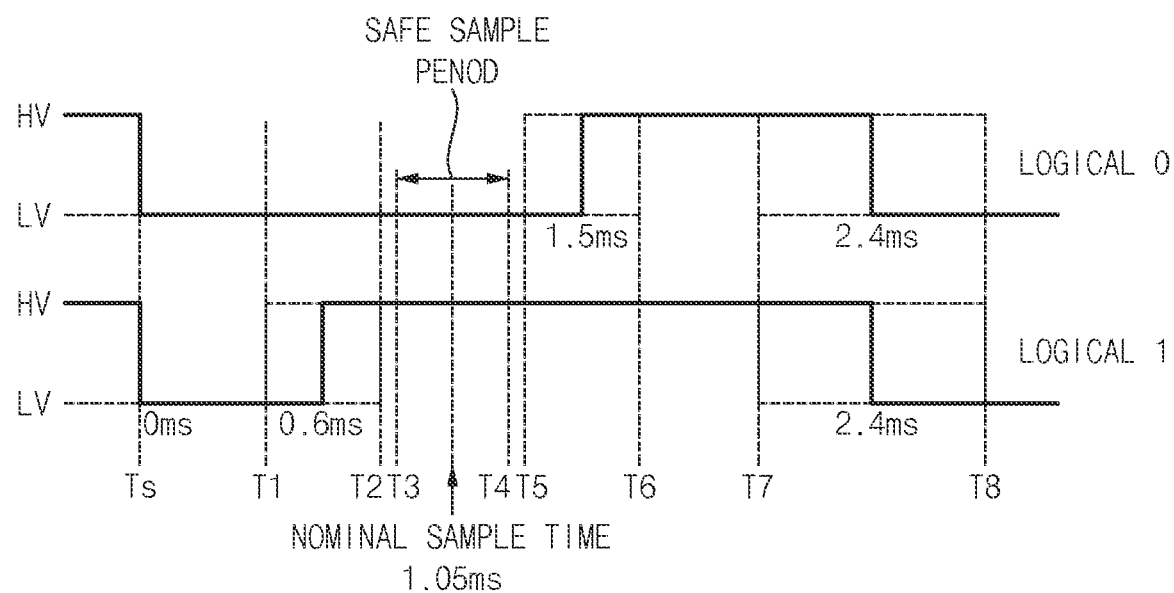

FIGS. 8, 9 and 10 are related timing diagrams illustrating in one example a bit timing approach for CEC communication performed through a CEC line of a digital system according to embodiments of the inventive concept.

All transactions on the CEC line consist of an initiator and one or more followers. The initiator device is responsible for sending the message structure and data. The follower device is responsible for receiving the data and setting the acknowledgment bits. One message is delivered as one frame through the CEC line. A frame is a self-contained unit consisting of one start bit followed by a plurality of data bits.

The CEC line is pulled up to a high voltage HV (e.g., about 2.5 to 3.36V) in an idle state. The CEC communication is performed while a CEC device toggles a corresponding CEC bus line between a high voltage HV and a low voltage LV (e.g., about 0 to 0.6V).

FIG. 8 shows start bit timing according to the HDMI standard. The pulse format of the start bit is fixed in the form illustrated in FIG. 8 and indicates the start of a frame. The start bit is validated by the low interval (a) and the full interval (b).

FIGS. 9 and 10 illustrate data bit timing according to the HDMI standard. All remaining data bits after the start bit of the frame have consistent timing. There are two types of bits: the initiator asserted bit and the follower asserted bit.

All bits except acknowledgment bits are activated by the initiator device, and FIG. 9 shows logical 0 and logical 1 of the bit activated by the initiating device. The transition or toggling from the high voltage HV to the low voltage LV at the end of a data bit is the beginning of the next data bit, and only occurs when there is a next bit. After the last bit is transmitted, the CEC line remains idle at the high voltage HV.

FIG. 10 lists time values and timing for time points Ts, and T1 to T8, as defined by the HDMI standard. Sections T3 to T4 correspond to the safety sample section, and the middle of the section corresponds to the nominal sampling time.

Figure 11:
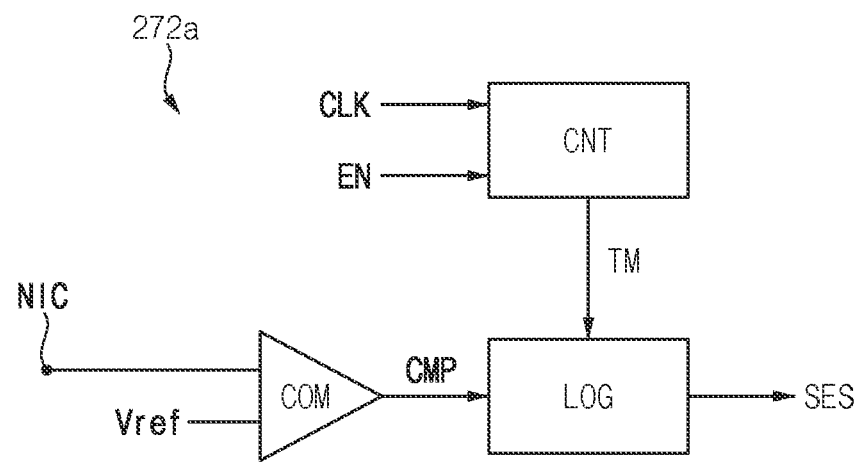
FIG. 11 is a block diagram illustrating in one example a stuck monitor included in the CEC controller of FIG. 6.
Figure 12:
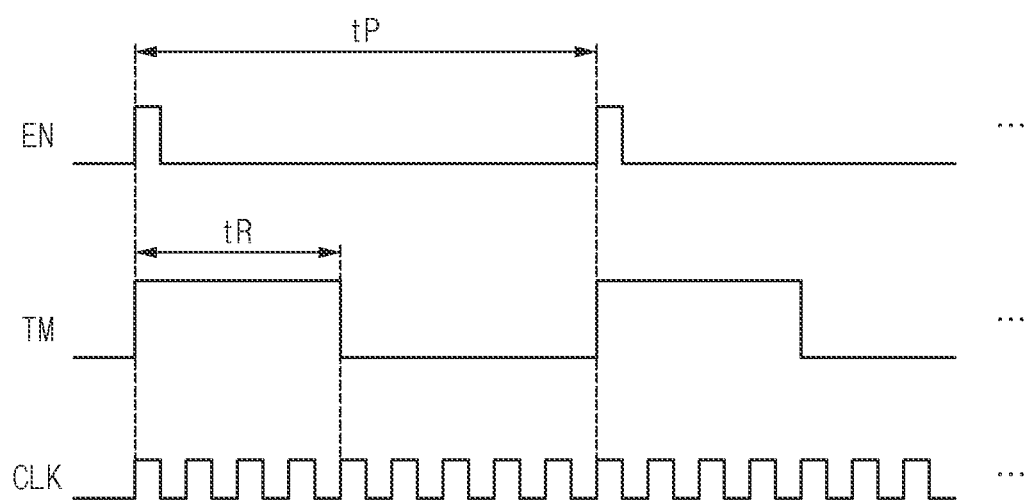
FIG. 12 is a timing diagram illustrating signals associated with the stuck monitor of FIG. 11.
Figures 13, 14:
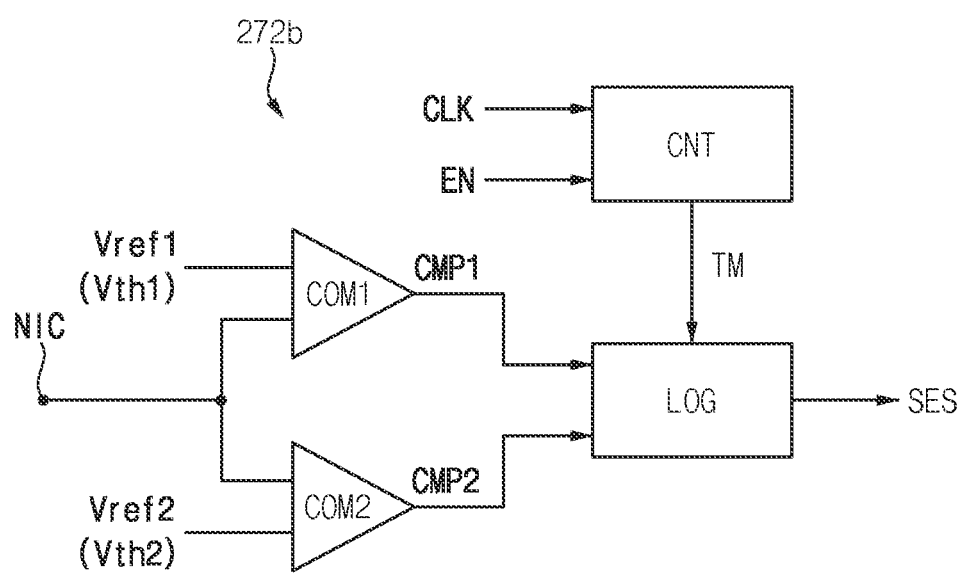
FIG. 13 is a diagram illustrating voltages associated with the stuck monitor of FIG. 11.
FIG. 14 is a block diagram illustrating in another example a stuck monitor included in the CEC controller of FIG. 6.

FIG. 11 is a block diagram further illustrating in one example (272a) the stuck monitor 272 included in the CEC controller 270 of FIG. 6; FIG. 12 is a timing diagram illustrating various signals associate with the stuck monitor 272a of FIG. 11; and FIG. 13 is a voltage waveform diagram illustrating certain voltages associated with the stuck monitor 272a of FIG. 11.

Referring to FIG. 11, the stuck monitor 272a may include a comparator COM, a counter CNT and a logic circuit LOG.

The comparator COM compares the voltage of the internal CEC node NIC with the reference voltage Vref to generate a comparison signal CMP. As described above, the CEC lines included in one or more connected HDMI cables respectively connected to the plurality of HDMI ports are commonly connected to the internal CEC node NIC. When the CEC communication is normally performed, the CEC line toggles between the high voltage HV and the low voltage LV. As further illustrated in FIG. 13, the voltage level of the reference voltage Vref may be determined at an appropriate level between the high voltage HV and the low voltage LV (e.g., about 1.5V).

When the voltage of the internal CEC node NIC is lower than or equal to the reference voltage Vref, the voltage of the internal CEC node NIC may be deemed to be at a logically "low" level. Accordingly, the comparator CMP may output a low comparison signal CMP when the voltage of the internal CEC node NIC is equal to or lower than the reference voltage Vref. Alternately, when the voltage of the internal CEC node NIC is higher than or equal to the reference voltage Vref, the voltage of the internal CEC node NIC may be deemed to be at a logically "high" level. Accordingly, the comparator CMP may output a high comparison signal CMP when the voltage of the internal CEC node NIC is higher than or equal to the reference voltage Vref.

The counter CNT may generate a timing signal TM representing a reference time tR based on a clock signal CLK. In some embodiments, as shown in FIG. 12, the timing signal TM activated during the reference time tR may be generated by counting the number of clocks corresponding to the reference time tR of the clock signal CLK. For example, the reference time tR may be about 10 seconds.

The counter CNT may activate the timing signal TM for the reference time tR whenever the enable signal EN is activated. The enable signal EN may be generated by the diagnostic controller 273 of FIG. 6. When the CEC error occurs, the diagnostic controller 273 may activate the enable signal EN and the stuck monitor 272a may update the CEC error information CEINF, at the time when CEC error information CEINF needs to be updated in the process of executing the user guide. (See, description associated with FIGS. 16, 17 and 18). Alternately, while no CEC error occurs, the diagnostic controller 273 may periodically activate the enable signal EN every monitoring period tP, and the stuck monitor 272a may periodically update the CEC error information CEINF.

The logic circuit LOG may generate a CEC error signal SES indicating whether a CEC error has occurred in response to the comparison signal CMP and the timing signal TM. In some embodiments, the aforementioned CEC error information CEINF may be the CEC error signal SES itself or the information generated based on the CEC error signal SES.

The logic circuit LOC may determine that the CEC error has occurred when the voltage of the internal CEC node NIC maintains the low level for the reference time tR or when the voltage of the internal CEC node NIC maintains a high level for the reference time tR. For example, the logic circuit LOC may activate the CEC error signal SES to the high level if it determines that the CEC error has occurred, and maintained the deactivated state of the CEC error signal SES to the low level if no CEC error has occurred.

Figure 15:
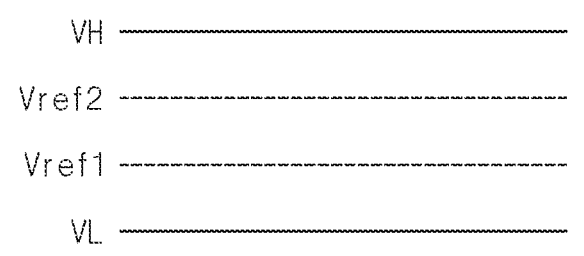

FIG. 14 is a block diagram illustrating in another example (272b) the stuck monitor 272 included in the CEC controller 270 of FIG. 6, and FIG. 15 is a voltage waveform diagram illustrating voltages associated with the stuck monitor 272b of FIG. 14.

Referring to FIG. 14, the stuck monitor 272b may include a first comparator COM1, a second comparator COM2, a counter CNT and a logic circuit LOG.

The first comparator COM1 compares the voltage of the internal CEC node NIC with a first reference voltage Vref1 to generate a first comparison signal CMP1. The second comparator COM2 compares the voltage of the internal CEC node NIC with a second reference voltage Vref2 to generate the second comparison signal CMP2. As described above, the CEC lines included in one or more connected HDMI cables respectively connected to the plurality of HDMI ports are commonly connected to the internal CEC node NIC.

As described above, when the CEC communication is normally performed, the CEC line toggles between the high voltage HV and the low voltage LV. As shown in FIG. 15, the voltage level of the first reference voltage Vref1 is higher than the low voltage LV, the voltage level of the second reference voltage Vref2 is lower than the high voltage HV, and the first reference voltage Vref1 may be determined to appropriate levels higher than Vref1. For example, the first reference voltage Vref1 may be about 0.6V, and the second reference voltage Vref2 may be about 2.5V.

When the voltage of the internal CEC node NIC is equal to or lower than the first reference voltage Vref1, the first comparator CMP1 may output the first comparison signal CMP1 having the low level, and the second comparator CMP2 may output the second comparison signal having the low level. In this case, that is, when the voltage of the internal CEC node NIC is equal to or lower than the first reference voltage Vref1, it may be determined that the voltage of the internal CEC node NIC is at a low level.

Alternately, when the voltage of the internal CEC node NIC is equal to or higher than the second reference voltage Vref2, the first comparator CMP1 may output the first comparison signal CMP1 having the high level, and the second comparator CMP2 may output the second comparison signal CMP2 having the high level. In this case, when the voltage of the internal CEC node NIC is higher than or equal to the second reference voltage Vref2, it may be determined that the voltage of the internal CEC node NIC is at a high level.

When the voltage of the internal CEC node NIC is between the first reference voltage Vref1 and the second reference voltage Vref2, the first comparator CMP1 may output the first comparison signal CMP1 having the high level, and the second comparator CMP2 may output the second comparison signal CMP2 having the low level. In this case, that is, when the voltage of the internal CEC node NIC is between the first reference voltage Vref1 and the second reference voltage Vref2, the voltage of the internal CEC node NIC may be considered to maintain the previous logic level.

The counter CNT may generate a timing signal TM representing a reference time tR based on a clock signal CLK. In some embodiments, as described above with reference to FIG. 12, the timing signal TM activated during the reference time tR is generated by counting the number of clocks corresponding to the reference time tR of the clock signal CLK. For example, the reference time tR may be about 10 seconds.

The counter CNT may activate the timing signal TM for the reference time tR whenever the enable signal EN is activated. The enable signal EN may be generated by the diagnostic controller 273 of FIG. 6. The diagnostic controller 273 may activate the enable signal EN at the time when CEC error information CEINF needs to be updated in the process of performing the user guide as described with reference to FIGS. 16 to 18 when a CEC error occurs, and the stuck monitor 272a may update CEC error information CEINF. Meanwhile, while no CEC error occurs, the diagnostic controller 273 may periodically activate the enable signal EN every monitoring period tP, and the stuck monitor 272a may periodically update the CEC error information CEINF.

The logic circuit LOG may generate a CEC error signal SES indicating whether a CEC error has occurred based on the comparison signal CMP and the timing signal TM. According to embodiments of the inventive concept, the aforementioned CEC error information CEINF may be the CEC error signal SES itself or the information generated based on the CEC error signal SES.

The logic circuit LOC may determine that no CEC error has occurred when the voltage of the internal CEC node NIC transitions between the low level and the high level during the reference time tR. For example, the logic circuit LOC may activate the CEC error signal SES to the high level if it determines that a CEC error has occurred and maintain the deactivate state of the CEC error signal SES to the low level if it is determined that no CEC error has occurred.

In some embodiments, the first reference voltage Vref1 applied to the first comparator COM1 may be replaced with a low threshold voltage Vth1, and the second reference voltage Vref2 applied to the second comparator COM2 may be replaced with a high threshold voltage Vth2 that is higher than the low threshold voltage Vth1. For example, the low threshold voltage Vth1 may be about 1V and the high threshold voltage Vth2 may be about 5V.

In this case, the logic circuit LOG may determine that a CEC error has occurred, when the voltage of the internal CEC node NINC is maintained below the low threshold voltage Vth1 for the reference time tR or when the voltage of the internal CEC node NIC is maintained higher than the high threshold voltage Vth2 for the reference time tR. In other words, the logic circuit LOG may determine that a CEC error has occurred when the first comparison signal CMP1 maintains the low level for the reference time period tR or when the second comparison signal CMP2 maintains the high level for the reference time period tR.

Figure 16:
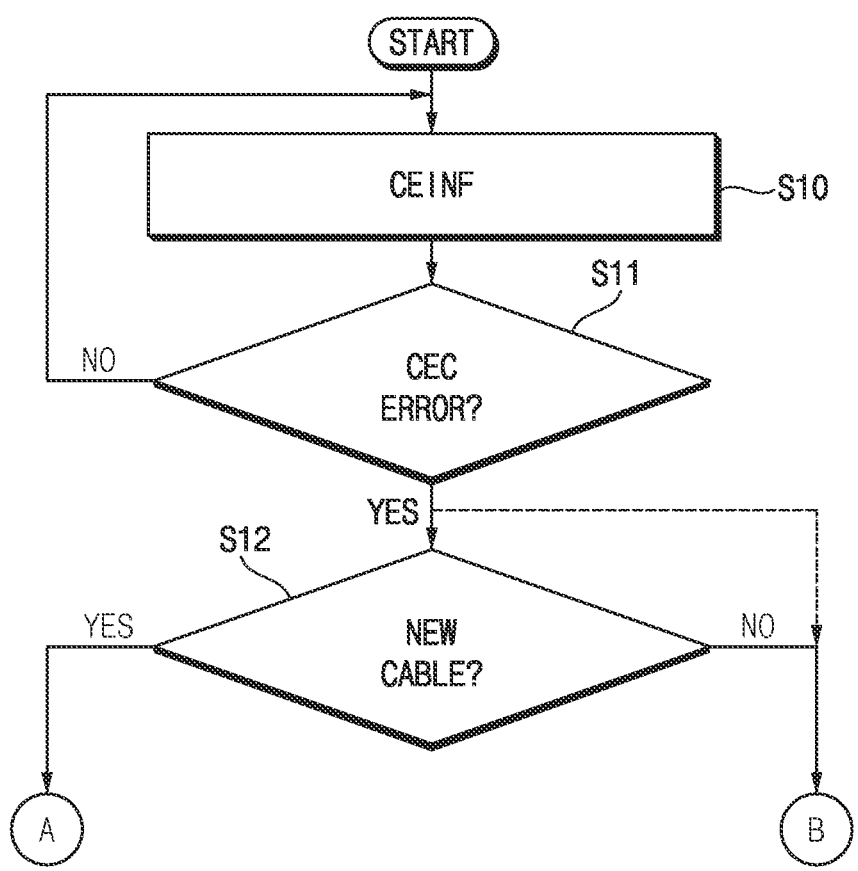
FIGS. 16, 17 and 18 are related flowcharts illustrating in one example a method of controlling CEC communication of a sink device according to embodiments of the inventive concept.
Figure 17:
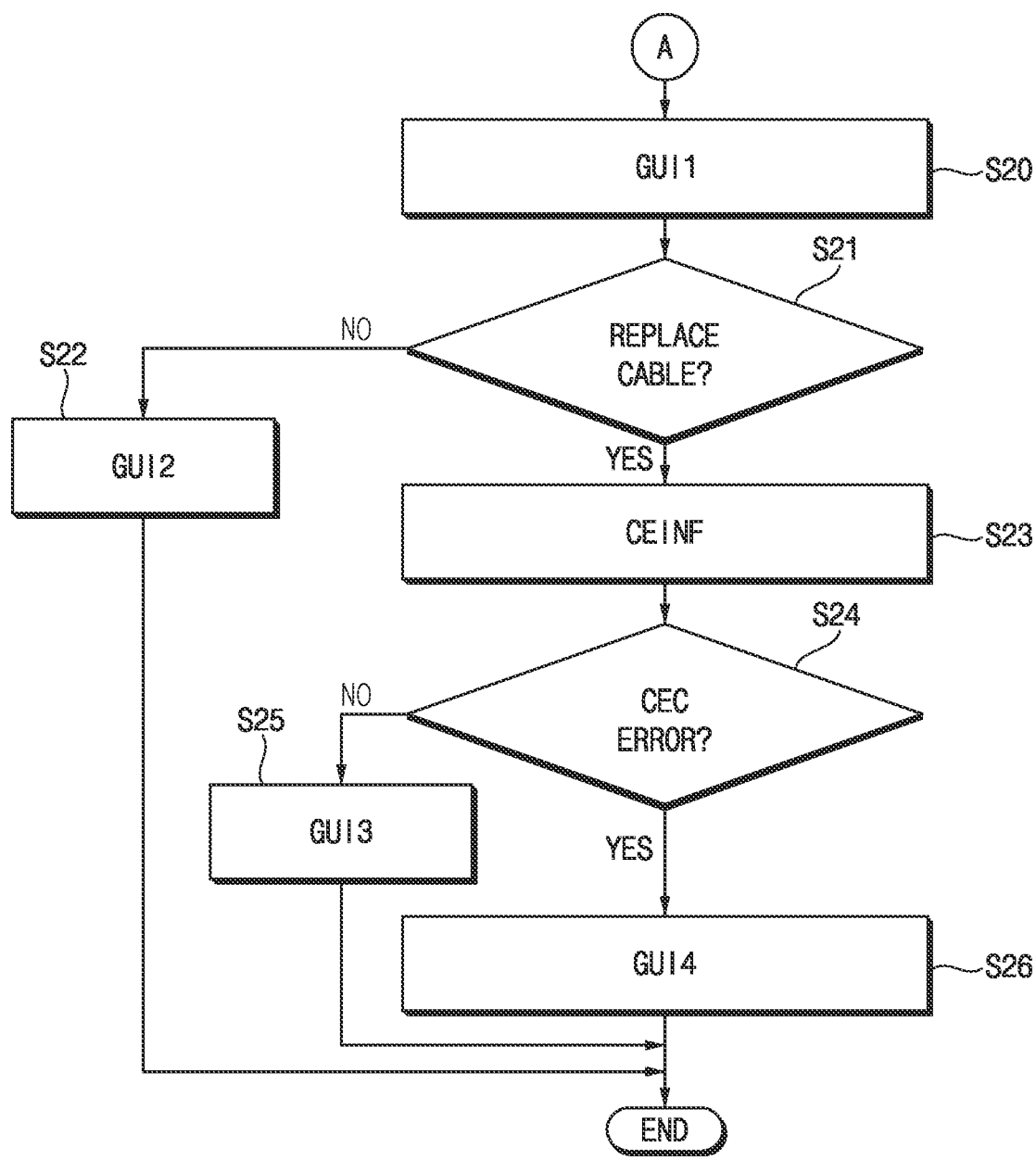
Figure 18:
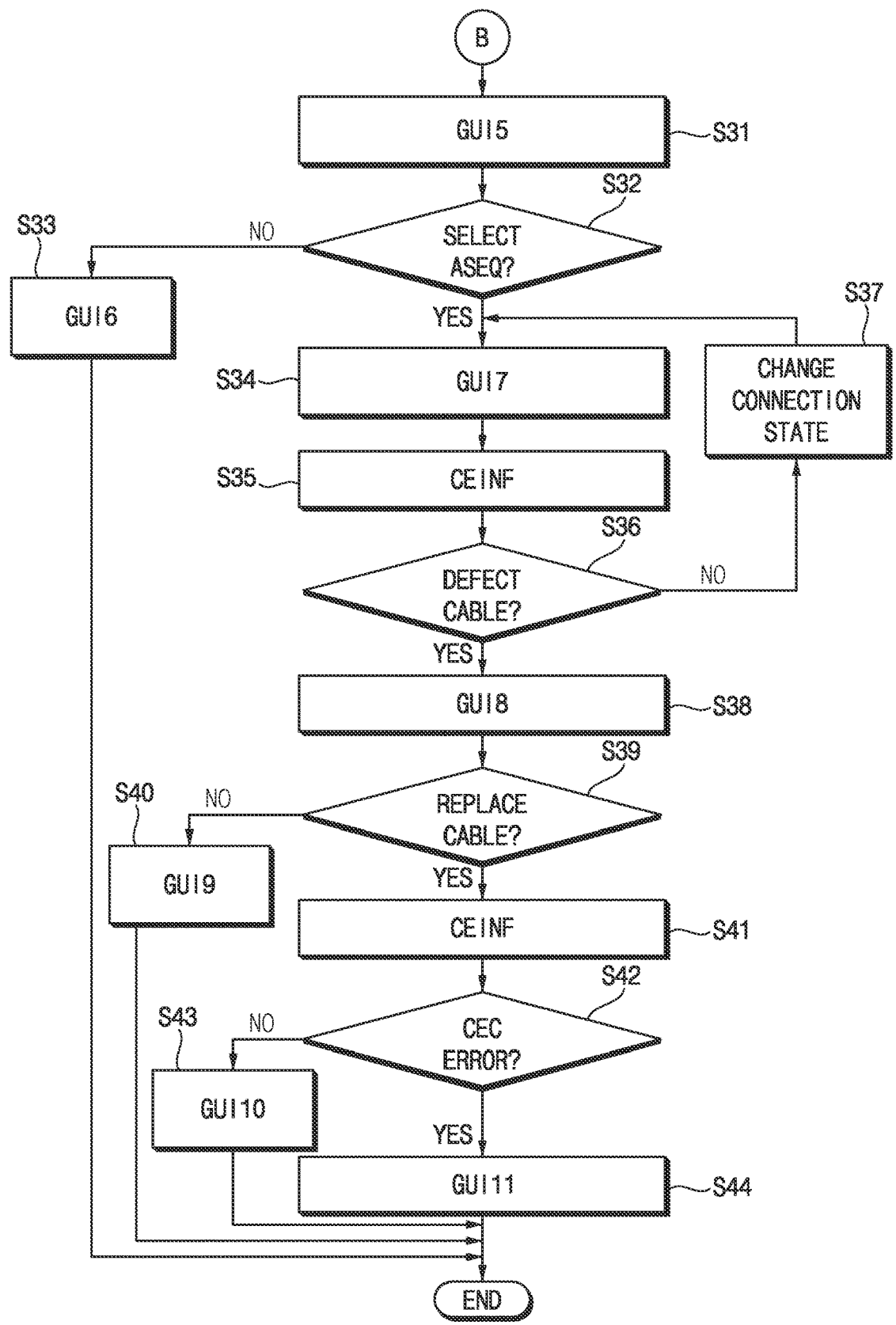
Figure 19:
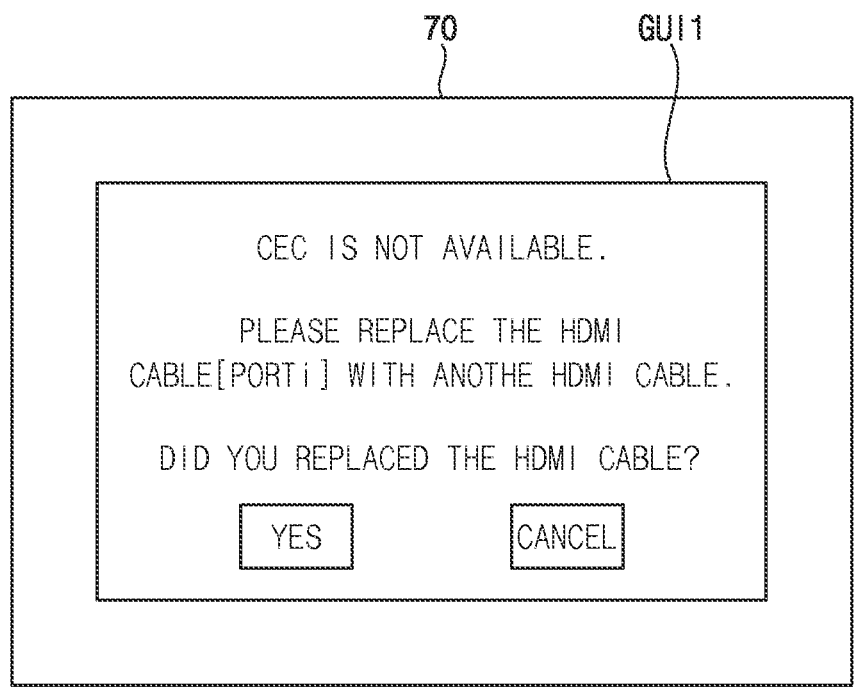
FIG. 19 is a conceptual diagram illustrating in one example a graphic user interface (GUI) associated with a user guide according to embodiments of the inventive concept.

FIGS. 16, 17 and 18 are related flowcharts illustrating in one example a method of controlling CEC communication of a sink device according to embodiments of the inventive concept. And FIG. 19 is a conceptual diagram illustrating in one example a graphic user interface that may be used to execute a user guide according to embodiments of the inventive concept.

Referring to FIGS. 6, 16, 17, 18, and 19 the stuck monitor 272 may generate CEC error information CEINF by monitoring whether the voltage of the internal CEC node NIC to which the CEC lines are commonly connected is fixed (S10). Diagnostic controller 273 may determine whether a CEC error has occurred based on the CEC error information CEINF (S11).

When the CEC error does not occur (S11=NO), as described with reference to FIG. 12, the enable signal EN may be periodically activated every monitoring period tP, and the stuck monitor 272 may periodically update the CEC error information CEINF.

When a CEC error has occurred (S11=YES), the diagnostic controller 273 may determine, in response to the cable connection information CCINF and the CEC error information CCINF, whether the CEC error occurs within a threshold time after a new HDMI cable is connected to one of the plurality of HDMI ports (S12). For example, the threshold time may be about one second.

When the new HDMI cable is connected, within the threshold time, to the HDMI port that has not been connected by the user, the diagnostic controller 273 may activate the enable signal EN such that the stuck monitor 272 may be controlled to update CEC error information CEINF.

Here, if the updated CEC error information CEINF indicates that a CEC error has occurred, that is, if a CEC error has occurred within the threshold time after the new HDMI cable is connected (S12=YES), the diagnostic controller 273 may determine that the new HDMI cable is a defective HDMI cable having a stuck CEC line.

In this case, diagnostic controller 273 may notify the user to replace the defective HDMI cable with another HDMI cable through execution of the user guide using (e.g.,) a graphic user interface (S20). For example, as illustrated in FIG. 19, a graphic user interface GUI1 may be displayed on the monitor screen 70 to inform the user that CEC is disabled and to select whether to replace the defective HDMI cable with another HDMI cable.

The user may click the YES button after replacing the defective HDMI cable with another HDMI cable or click the CANCEL button if the user does not want to replace the defective HDMI cable.

If the user does not replace the defective HDMI cable with another HDMI cable (S21=NO), the diagnostic controller 273 may notify the user that CEC communication is disabled (not available) through the graphic user interface GUI2 (S22), and the user guide may be terminated. Accordingly, the diagnostic controller 273 may provide diagnostic result information ARINF indicating that CEC communication is disabled to a processor in the sink device.

When the user replaces the defective HDMI cable with another HDMI cable (S21=YES), the diagnostic controller 273 may update the error information CEINF by controlling the stuck monitor 272 as described above (S23). The diagnostic controller 273 may determine whether a CEC error has occurred based on the updated CEC error information CEINF (S24).

When the CEC error does not occur after replacing the new HDMI cable with another HDMI cable (S24=NO), the diagnostic controller 273 may determine that the new HDMI cable is a defective HDMI cable having a stuck CEC line. In this case, the diagnostic controller 273 notifies the user that the use of the defective HDMI cable is prohibited, and normal CEC communication may be performed by the other HDMI cable through the graphic user interface GUI3 (S25), and the user guide may be terminated.

If the CEC error occurs even after replacing the new HDMI cable with another HDMI cable (S24=YES), the diagnostic controller 273 may determine that the HDMI port to which the defective HDMI cable is connected is a defective HDMI port. In this case, diagnostic controller 273 may notify the user of required actions for the defective HDMI port through the graphic user interface GUI4 (S26) and the user guide is terminated. For example, the diagnostic controller 273 may inform, through the graphic user interface GUI4, that the failure of CEC communication is a problem of the sink device and guide the user to inquire l'Z the device manufacturer or purchase an HDMI CEC-Less adapter or HDMI CEC-Less cable.

When a CEC error has occurred regardless of a new HDMI cable (S12=NO), the diagnostic controller 273 may notify the user of the CEC communication failure state and notify the user to select whether or not to perform a diagnostic sequence ASEQ to diagnose a failure of CEC communication and a cause of the CEC error through a graphic user interface GUI5 (S31). In some embodiments, as indicated by a dotted line arrow in FIG. 16, regardless of whether a new HDMI cable is connected, the diagnostic controller 273 may determine the CESC communication failure state and notify the user to select whether or not to perform the diagnostic sequence ASEQ through the graphic user interface GUI5 (S31).

When the user does not select the diagnostic sequence ASEQ (S32=NO), the diagnostic controller 273 may notify the user that CEC communication is disabled through the graphic user interface GUI6 (S33) and terminate the user guide.

When the user selects performing the diagnostic sequence (ASEQ) (S32=YES), the diagnostic controller 273 may notify the user to sequentially change the connection state of the connected HDMI cables through the graphic user interface GUI7 (S34). In some embodiments, the change of the connection state may include sequentially removing the connected HDMI cables from the HDMI ports or sequentially connecting only one HDMI cable among the plurality of connected HDMI cables.

The diagnostic controller 273 may update the error information CEINF by controlling the stuck monitor 272 whenever the connection state of the connected HDMI cables is sequentially changed (S35), and determine, based on the updated CEC error information CEINF, that one of the connected HDMI cables is a defective HDMI cable having a stuck CEC line (S36). When the defective HDMI cable is not determined (S36=NO), the updating of the CEC error information CEINF (S35) and the determination of the defective HDMI cable (S36) may be repeated while changing the connection state (S37).

When the defective HDMI cable is determined (S36=YES), the diagnostic controller 273 may notify the user to replace the defective HDMI cable with another HDMI cable through the graphic user interface GUI8 (S38).

If the user does not replace the defective HDMI cable with another HDMI cable (S39=NO), the diagnostic controller 273 may notify the user that CEC communication is disabled through the graphic user interface GUI9 (S40), and the user guide may be terminated. Meanwhile, the diagnostic controller 273 may provide the diagnostic result information ARINF indicating that CEC communication is disabled to a processor in the sink device. When the user replaces the defective HDMI cable with another HDMI cable (S39=YES), the diagnostic controller 273 may update the error information CEINF by controlling the stuck monitor 272 as described above (S41). Diagnostic controller 273 may determine whether a CEC error has occurred based on the updated CEC error information CEINF (S42).

When the CEC error does not occur after replacing the new HDMI cable with another HDMI cable (S42=NO), the diagnostic controller 273 may, through the graphic user interface GUI10, notify the user that the use of the defective HDMI cable is prohibited and normal CEC communication may be performed with the other HDMI cable (S43).

When the CEC error has occurred even after replacing the defective HDMI cable with another HDMI cable (S42=YES), the diagnostic controller 273 may determine that the HDMI port to which the defective HDMI cable is connected is a defective HDMI port. In this case, the diagnostic controller 273 may notify the user of required actions for the defective HDMI port through the graphic user interface GUI11 (S44) and the user guide may be terminated. For example, the diagnostic controller 273 may, through the graphic user interface GUI44, inform that the failure of CEC communication is a problem of the sink device, and notify the user to inquire the device manufacturer, or purchase an HDMI CEC-Less adapter or HDMI CEC-Less cable.

Although embodiments of the inventive concept of one graphic user interface GUI1 are illustrated in FIG. 19, it will be understood that the above-described other graphic user interfaces GUI2 through GUI11 may be implemented in a similar manner. As described with reference to FIG. 6, the graphic user interface generator 274 may provide graphic user interfaces for executing the user guide according to the control of the diagnostic controller 273.

Figure 20:
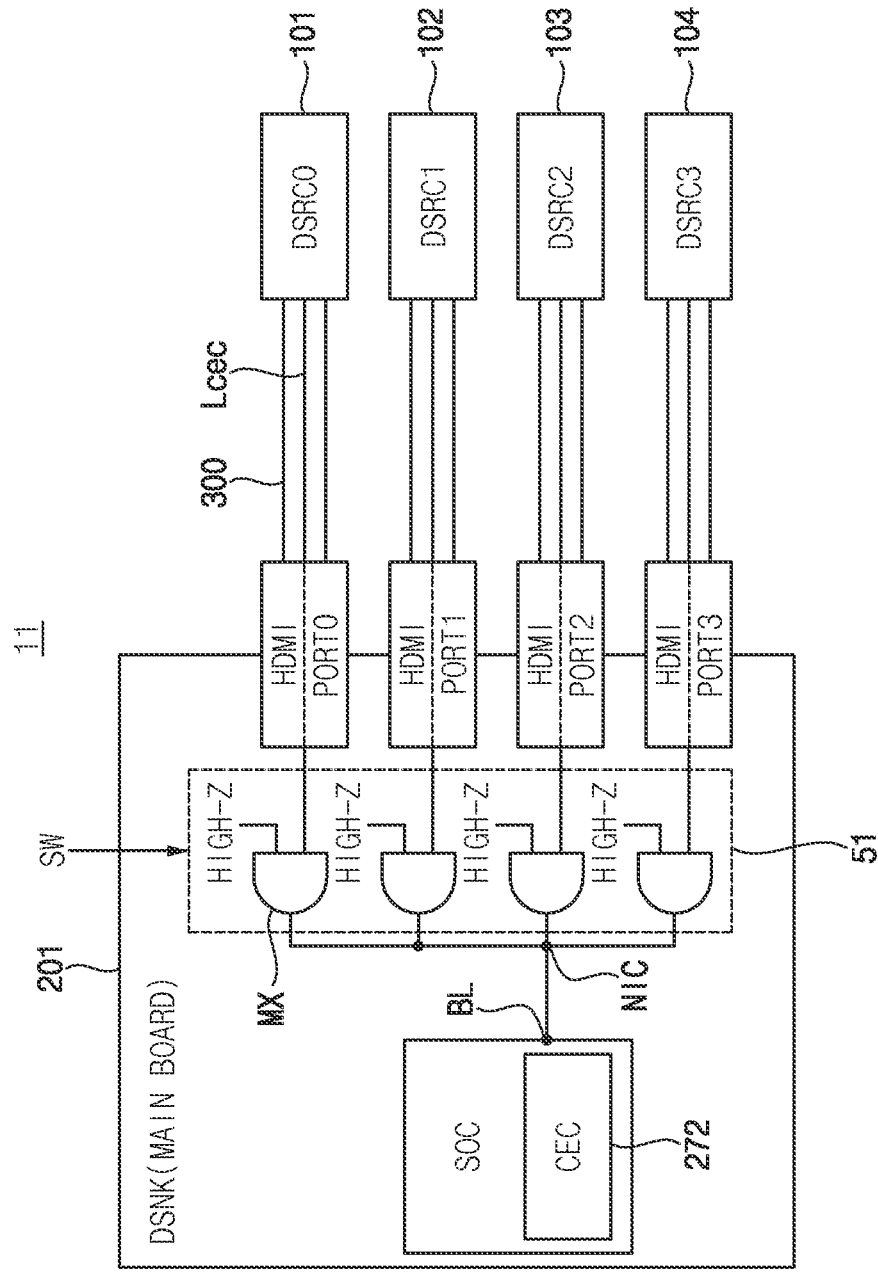
FIGS. 20, 21 and 22 are respective diagrams illustrating examples of various digital systems according to embodiments of the inventive concept.
Figure 21:
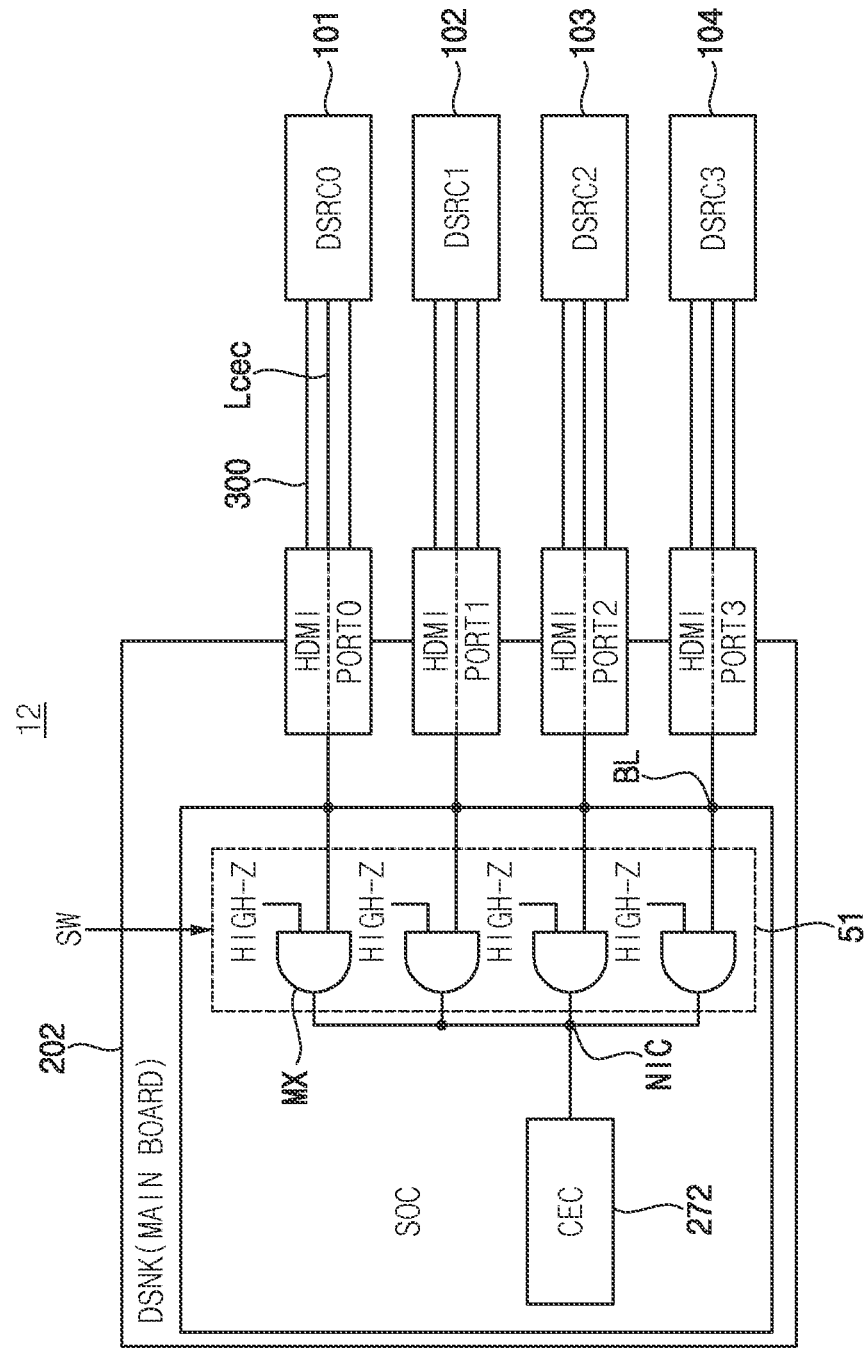
Figure 22:
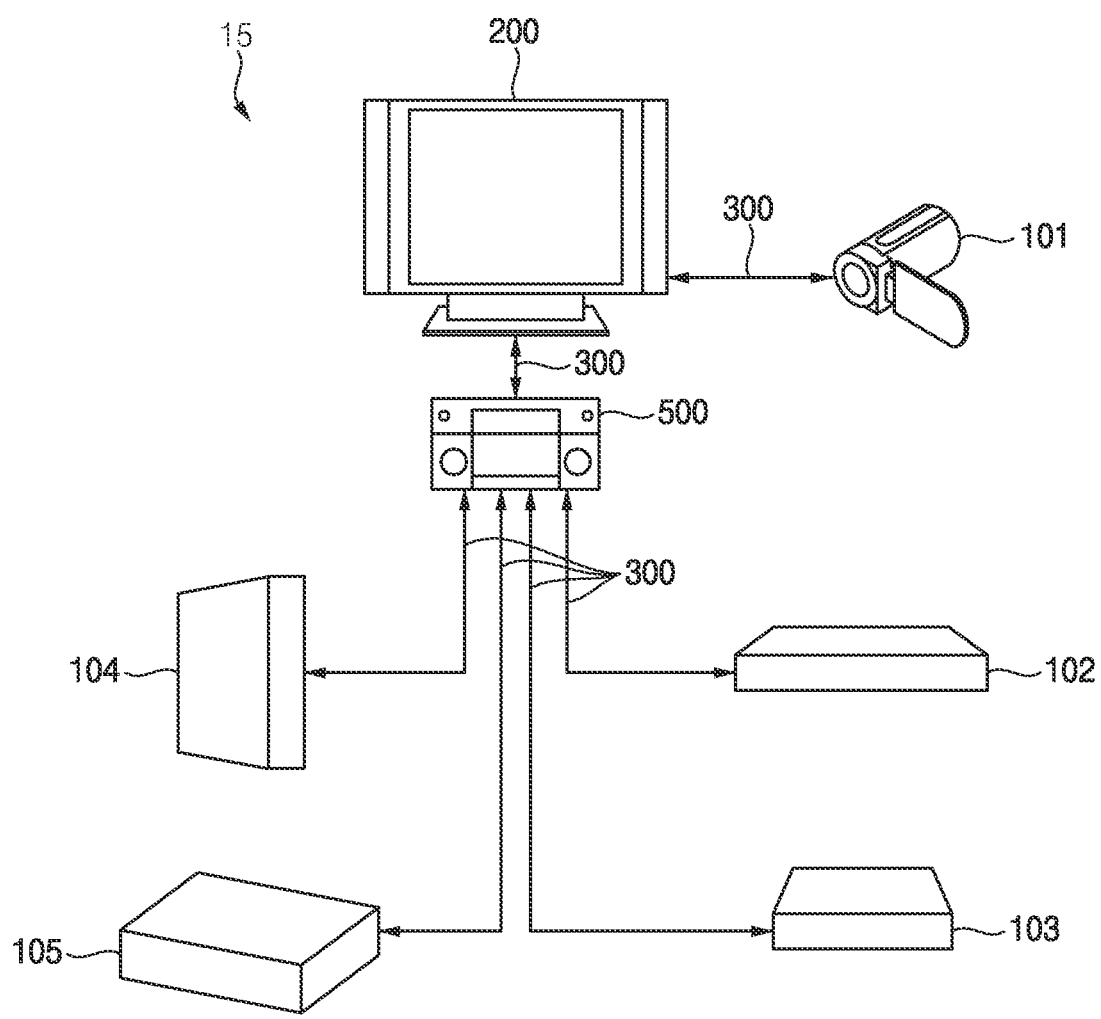

FIGS. 20, 21 and 22 are respective diagrams illustrating other digital systems (11, 12 and 13) according to embodiments of the inventive concept.

Referring to FIG. 20, the digital system 11 may include a sink device (DSNK) 201, one or more source devices (DSRC0, DSRC1, DSRC2 and SDRC3) 101, 102, 103 and 104, and one or more High-Definition Multimedia Interface (HDMI) cables 300 connecting the sink device 201 and the source devices 101, 102, 103 and 104, respectively.

The sink device 201 may include a plurality of HDMI ports PORT0-PORT3 and a consumer electronics control (CEC) controller 270. In some embodiments, the CEC controller 270 may be included in a System on Chip (SoC) mounted on a main board of the sink device 201.

The CEC lines Lcec respectively included in the HDMI cables 300 connected to the HDMI ports Port0-Port3 may be commonly connected to the CEC node NIC through CEC pins or CEC terminals included in the plurality of HDMI ports PORT0-PORT3).

CEC controller 270 may generate the CEC error information by monitoring whether a voltage of the internal CEC node NIC is fixed. Embodiments of the inventive concept of the CEC controller 270 are as described above with reference to FIG. 6.

Compared to the sink device 200 of FIG. 2, the sink device 201 of FIG. 20 may further include a switch circuit 51, wherein the switch circuit 51 may include a plurality of multiplexers MX respectively corresponding to the plurality of HDMI ports Port0-Port3. The switch circuit 51 may control the connection between the CEC lines and the internal CEC node NIC based on the switch signals SW. The diagnostic controller may provide the switch signals SW 273 of FIG. 6 and may include a plurality of signals that independently control the plurality of multiplexers MX. Each multiplexer MX may selectively connect a high impedance (HIGH-Z) or the corresponding CEC line to the internal CEC node NIC based on the corresponding switch signal.

Referring to FIG. 21, the digital system 12 may include a sink device (DSNK) 202, one or more source devices (DSRC0, DSRC1, DSRC2 and SDRC3) 101, 102, 103 and 104, and one or more High-Definition Multimedia Interface (HDMI) cables 300 connecting the sink device 201 and the source devices 101, 102, 103 and 104, respectively. Since the digital system 12 of FIG. 21 is similar to the digital system 11 of FIG. 20, repeated descriptions are omitted.

Compared to the digital system 11 of FIG. 20 in which the switch circuit 51 is disposed on the main board of the sink device 201, the digital system 12 of FIG. 21 has the switch circuit 51 included in the SoC that is mounted on the sink device 202. Accordingly, in the case of FIG. 20, the internal CEC node NIC is located on the main board of sink device 201, and in the case of FIG. 21, the internal CEC node NIC is located inside the SoC.

For example, the SoC may be mounted on a main board in a ball grid array (BGA) type. In the case of FIG. 20, the internal CEC node NIC on the main board may be connected to the SoC using a single ball, and in the case of FIG. 21, the CEC lines for the plurality of HDMI ports PORT0-PORT3 may be connected to the SoC using a plurality of balls and may be commonly connected to the internal CEC node NIC inside the SoC.

When the switch circuit 51 is provided as in the embodiments of the inventive concept of FIGS. 20 and 21, the diagnostic sequence ASEQ as described above may be automatically performed inside the sink device without user intervention.

Referring to FIG. 22, a digital system 15 includes a plurality of source devices 101, 102, 103, 104 and 10 providing digital content, and a video device, that is, a sink device 200 that processes and displays digital contents provided from the plurality of source devices 101, 102, 103, 104 and 10, and a plurality of HDMI cables 300.

The plurality of source devices 101, 102, 103, 104 and 10 may be multimedia transmitters that transmit digital content data to the sink device 200 through respective HDMI cables 300, and include camcorders, digital cameras, DVD players, BD players, PS3, set-top boxes, mobile phones.

The sink device 200 may be a receiver that receives data transmitted from the plurality of source devices 101, 102, 103, 104 and 10 and output the received data on a screen, such as a monitor and a high-resolution digital TV.

In addition, a repeater 500 may be installed between the plurality of source devices 101, 102, 103, 104 and 10 and the sink device 200 to expand transfer of the digital signals.

The CEC communication control method described above may be applied to the repeater 500 as well as the sink device 200.

Figure 23:
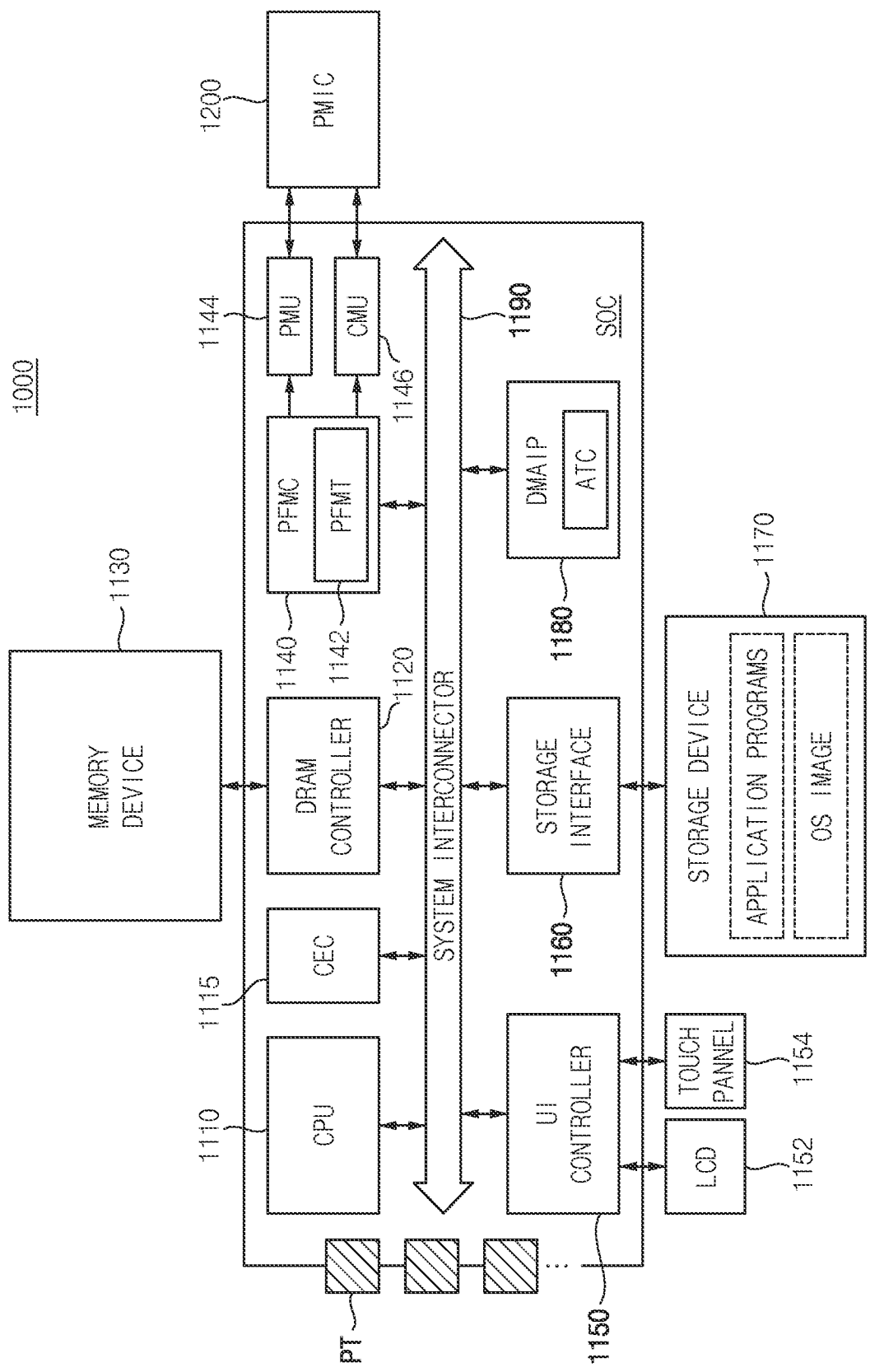
FIG. 23 is a block diagram illustrating a sink device according to embodiments of the inventive concept.

FIG. 23 is a block diagram illustrating a sink device 1000 according to embodiments of the inventive concept.

Referring to FIG. 23, the sink device 1000 may include a system on chip (SoC), a working memory 1130, a display device (LCD) 1152, a touch panel 1154, a storage device 1170, a power management integrated circuit (PMIC) 1200, etc. The SoC may include a processor (CPU) 1110, a CEC controller 1115, a memory controller 1120, a performance controller 1140, a user interface controller (UI controller) 1150, a storage interface 1160, and a direct memory access device DMAIP 1180 having a function of direct memory access, a power management unit (PMU) 1144, a clock management unit (CMU) 1146, etc. It will be understood that components of the sink device 1000 are not limited to the components shown in FIG. 23. For example, the sink device 1000 may further include a hardware codec for processing image data, a security block, etc.

The processor 1110 executes software (e.g., an application program, an operating system (OS), and/or device drivers) for the sink device 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The memory controller (e.g., DRAM controller) 1120 provides interfacing between the working memory 1130 and the SoC. The memory controller 1120 may access the working memory 1130 according to a request of the processor 1110 or another intellectual property (IP) block.

The operating system (OS) or basic application programs may be loaded into the working memory 1130 during a booting operation. The performance controller 1140 may adjust operation parameters of the SoC according to a control request provided from the kernel of the operating system (OS). For example, the performance controller 1140 may adjust the level of dynamic voltage and frequency scaling (DVFS) to enhance performance of the SoC.

The user interface controller 1150 controls user input and output from user interface devices. For example, the user interface controller 1150 may display a keyboard screen for inputting data to the display device 1152 according to the control of the processor 1110. Alternatively, the user interface controller 1150 may control the display device 1152 to display data that a user requests. The user interface controller 1150 may decode data provided from user input means, such as a touch panel 1154, into user input data.

The storage interface 1160 accesses the storage device 1170 according to a request of the processor 1110. For example, storage interface 1160 provides interfacing between the SoC and the storage device 1170. For example, data processed by processor 1110 is stored in storage device 1170 through the storage interface 1160. Alternatively, data stored in storage device 1170 may be provided to the processor 1110 through the storage interface 1160.

The storage device 1170 is provided as a storage medium of the sink device 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as phase-change random access memory (RAM) (PRAM), magnetic RAM (MRAM), resistance RAM (ReRAM), and ferromagnetic RAM (FRAM) and/or NOR-type flash memory.

The direct memory access device 1180 may be provided as a separate intellectual property (IP) component to increase processing speed of multimedia or multimedia data. For example, the direct memory access device 1180 may be provided as an intellectual property (IP) component to enhance processing performance of a text, audio, still images, animation, video, two-dimensional data or three-dimensional data.

A system interconnector 1190 may be a system bus to provide an on-chip network in the SoC. The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

In some embodiments, the CEC controller 1115 may control CEC communication performed through CEC lines included in a plurality of HDMI ports PT. As described above with reference to FIG. 6, the CEC controller 1115 may include a cable connection monitor 271, a stuck monitor (SMON) 272, a diagnostic controller (ACON) 273, and a graphic user interface generator (GUIG) 274. The CEC controller 1115 may monitor whether an HDMI cable is connected to each of the plurality of HDMI ports PT of the sink device 1000 to generate the cable connection information, and generate the CEC error information by monitoring whether a voltage of an internal CEC node to which the CEC lines included in each of the connection HDMI cables are commonly connected is fixed. The CEC controller 1115 may perform the user guide for diagnosing a stuck state of the CEC lines of the connected HDMI cables based on the cable connection information and the CEC error information.

As described above, the sink device, the digital system and the method of controlling CEC communication according to embodiments of the inventive concept may optimize the CEC communication and enhance the performance of the sink device and the digital system by efficiently diagnosing the CEC error and facilitating proper measures based on the diagnosis. In addition, by notifying the user of the proper measures with respect to the CEC error through the user guide, the user's product reliability may be improved, and post-service costs may be reduced.

Embodiments of the inventive concept may be applied to any electronic devices and systems having a function of direct memory access. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an automotive driving system, a server system, etc.

The foregoing embodiments are presented as teaching examples. Those skilled in the art will readily appreciate that many modifications are possible in relation to the described and illustrated embodiments without materially departing from the scope of the inventive concept as defined by the following claims.

What is claimed is:

1. A method of controlling consumer electronics control (CEC) communication between a sink device and a plurality of source devices connected through high-definition multimedia interface (HDMI) cables, the method comprising:
    generating cable connection information by monitoring whether the HDMI cables are respectively connected to a HDMI port among a plurality of HDMI ports of the sink device;
    generating CEC error information by monitoring whether a voltage of an internal CEC node is fixed, wherein CEC lines included in connected HDMI cables are commonly connected to the internal CEC node and the connected HDMI cables indicate present connection to the plurality of HDMI ports; and
    executing a user guide to diagnose a stuck state of the CEC lines of the connected HDMI cables in response to the cable connection information and the CEC error information.

2. The method of claim 1, wherein the generating of the cable connection information includes:
    applying a pull-up voltage to a ground terminal among input terminals included in each HDMI port among the plurality of HDMI ports; and
    generating a cable connection signal indicating whether an HDMI cable is connected to each HDMI port in response to a voltage of the ground terminal.

3. The method of claim 1, wherein the generating of the CEC error information includes:
    determining that the voltage of the internal CEC node is at a low level when the voltage of the internal CEC node is lower than or equal to a reference voltage;
    determining that the voltage of the internal CEC node is a high level when the voltage of the internal CEC node is higher than the reference voltage; and
    determining that a CEC error has occurred when the voltage of the internal CEC node is maintained at the low level during a reference time, or the voltage of the internal CEC node is maintained at the high level during the reference time.

4. The method of claim 1, wherein the generating of the CEC error information includes:

determining that the voltage of the internal CEC node is at a low level when the voltage of the internal CEC node is lower than or equal to a first reference voltage;

determining that the voltage of the internal CEC node is a high level when the voltage of the internal CEC node is higher than or equal to a second reference voltage higher than the first reference voltage; and determining that a CEC error has not occurred when the voltage of the internal CEC node transitions between the low level and the high level during a reference time.

5. The method of claim 1, wherein the generating of the CEC error information includes:

determining that a CEC error has occurred when the voltage of the internal CEC node is maintained lower than a low threshold voltage during a reference time, or when the voltage of the internal CEC node is maintained higher than a low threshold voltage.

6. The method of claim 1, wherein the executing of the user guide includes:

when a CEC error occurs, notifying a user to select whether or not to perform a diagnostic sequence to diagnose at least one of failure of the CEC communication and a cause of the CEC error.

7. The method of claim 6, wherein the executing of the user guide further includes:

when the user selects performing the diagnostic sequence, notifying the user to sequentially change connection states of the connected HDMI cables; and determining that one of the connected HDMI cables is a defective HDMI cable including a stuck CEC line in response to CEC error information determined while sequentially changing the connection states of the connected HDMI cables.

8. The method of claim 7, wherein the executing of the user guide further includes:

notifying the user to replace the defective HDMI cable with another HDMI cable; and when the user replaces the defective HDMI cable with another HDMI cable, determining whether the CEC error has occurred in response to the CEC error information.

9. The method of claim 8, wherein the executing of the user guide further includes:

when the CEC error persists after the defective HDMI cable is replaced with another HDMI cable, determining that the HDMI port to which the defective HDMI cable is connected is a defective HDMI port; and notifying the user of the defective HDMI port.

10. The method of claim 1, further comprising:

in response to the cable connection information and the CEC error information, determining whether a CEC error occurs within a threshold time after a new HDMI cable is connected to one of the HDMI ports.

11. The method of claim 10, wherein the executing of the user guide further includes:

when the CEC error occurs within the threshold time after the new HDMI cable is connected to one of the plurality of HDMI ports, determining that the new HDMI cable is a defective HDMI cable including a stuck CEC line;

notifying the user to replace the defective HDMI cable with another HDMI cable; and determining whether a CEC error occurs in response to the CEC error information after the defective HDMI cable is replaced with another HDMI cable.

12. The method of claim 11, wherein the executing of the user guide further includes:

when the CEC error does not occur after replacing the new HDMI cable with another HDMI cable, determining that the new HDMI cable is a defective HDMI cable including a stuck CEC line; and notifying the user that use of the defective HDMI cable is prohibited and normal CEC communication is performed by the other HDMI cable.

13. The method of claim 11, wherein the executing of the user guide further includes:

when the CEC error has occurred even after the defective HDMI cable is replaced with the new HDMI cable, determining that the HDMI port to which the new HDMI cable is connected is a defective HDMI port; and notifying the user of the defective HDMI port.

14. The method of claim 1, wherein the executing of the user guide includes:

notify the user of whether a CEC error has occurred and required actions for resolution of the CEC error; and displaying a graphic user interface on a display device to receive an input of the user.

15. The method of claim 1, further comprising:

periodically updating the CEC error information.

16. A sink device connected to a plurality of source devices through high-definition multimedia interface (HDMI) cables, the sink device comprising:

a plurality of HDMI ports respectively connecting HDMI cables from source devices;

a cable connection monitor configured to monitor whether an HDMI cable is connected to each HDMI port among the plurality of HDMI ports to generate cable connection information;

a stuck monitor configured to monitor whether a voltage of an internal consumer electronics control (CEC) node to is fixed, wherein CEC lines included in the HDMI cables are commonly connected to the internal CEC node and the HDMI cables indicate present connection to the plurality of HDMI ports; and a diagnostic controller configured to execute a user guide to diagnose a stuck state of the CEC lines of the HDMI cables in response to the cable connection information and CEC error information.

17. The sink device of claim 16, wherein the cable connection monitor includes:

a plurality of monitoring units respectively corresponding to the plurality of HDMI ports, wherein each monitoring unit of the plurality of monitoring units includes:

a resistor configured to apply a pull-up voltage to a ground terminal among input terminals included in each HDMI port among the plurality of HDMI ports; and a comparator generating a cable connection signal indicating whether an HDMI cable is connected to each HDMI port by comparing a voltage of the ground terminal and a monitoring reference voltage.

18. The sink device of claim 16, wherein the stuck monitor includes:

a comparator configured to generate a comparison signal by comparing the voltage of the internal CEC node with a reference voltage;

a counter configured to generate a timing signal representing a reference time in response to a clock signal; and a logic circuit configured to generate a CEC error signal indicating whether a CEC error has occurred in response to the comparison signal and the timing signal.

19. The sink device of claim 16, wherein the stuck monitor includes:
  a first comparator configured to generate a first comparison signal by comparing the voltage of the internal CEC node with a first reference voltage;
  a second comparator configured to generate a second comparison signal by comparing the voltage of the internal CEC node with a second reference voltage higher than the first reference voltage;
  a counter configured to generate a timing signal representing a reference time in response to a clock signal; and
  a logic circuit configured to generate a CEC error signal indicating whether a CEC error has occurred in response to the first comparison signal, the second comparison signal and the timing signal.

20. A digital system comprising:
a sink device;
at least one source device; and
high-definition multimedia interface (HDMI) cables respectively connecting the sink device and the at least one source device,
wherein the sink device includes:
  a plurality of HDMI ports configured to connect HDMI cables respectively connected to the at least one source device;
  a cable connection monitor configured to monitor whether an HDMI cable is connected to each HDMI cable among the plurality of HDMI ports to generate cable connection information;
  a stuck monitor configured to monitor whether a voltage of an internal consumer electronics control (CEC) node to is fixed to generate a CEC error information, wherein CEC lines included in the HDMI cables are commonly connected to the internal CEC node and the HDMI cables indicate present connection to the plurality of HDMI ports; and
a diagnostic controller configured to execute a user guide to diagnose a stuck state of the CEC lines of the HDMI cables in response to the cable connection information and the CEC error information.

* * * * *